(12) United States Patent
Fischell et al.

(10) Patent No.: US 11,709,262 B2
(45) Date of Patent: Jul. 25, 2023

(54) DOPPLER SHIFT NAVIGATION SYSTEM AND METHOD OF USING SAME

(71) Applicant: Woods Hole Oceanographic Institution, Woods Hole, MA (US)

(72) Inventors: Erin Fischell, East Falmouth, MA (US); Peter Traykovski, Falmouth, MA (US)

(73) Assignee: WOODS HOLE OCEANOGRAPHIC INSTITUTION, Woods Hole, MA (US)

( * ) Notice: Subject to any disclaimer, the term of this patent is extended or adjusted under 35 U.S.C. 154(b) by 0 days.

(21) Appl. No.: 17/425,343

(22) PCT Filed: Oct. 5, 2020

(86) PCT No.: PCT/US2020/054226
§ 371 (c)(1),
(2) Date: Jul. 23, 2021

(87) PCT Pub. No.: WO2021/067919
PCT Pub. Date: Apr. 8, 2021

(65) Prior Publication Data
US 2022/0221579 A1 Jul. 14, 2022

Related U.S. Application Data

(60) Provisional application No. 62/910,763, filed on Oct. 4, 2019.

(51) Int. Cl.
*G01S 13/937* (2020.01)
*G01S 13/50* (2006.01)

(52) U.S. Cl.
CPC .......... *G01S 13/937* (2020.01); *G01S 13/505* (2013.01)

(58) Field of Classification Search
CPC ...... G01S 13/937; G01S 13/505; G01S 11/10; G01S 13/583; G01S 19/05; G01S 13/74; G01S 19/42
See application file for complete search history.

(56) References Cited

U.S. PATENT DOCUMENTS

| 5,119,341 A | 6/1992 | Youngberg ........... G01S 5/0009 367/5 |
| 5,877,998 A | 3/1999 | Aidala ..................... G01S 5/18 367/124 |

(Continued)

OTHER PUBLICATIONS

Eustice, Ryan M. et al.,Synchronous-Clock, One-Way-Travel-Time Acoustic Navigation for Underwater Vehicles, J. Field Robotics, 2010, pp. 121-136, vol. 28(1), Wiley Periodicals, Inc.

(Continued)

*Primary Examiner* — Timothy A Brainard
*Assistant Examiner* — Kenneth W Good
(74) *Attorney, Agent, or Firm* — Douglas Denninger; Cristy Salanga

(57) ABSTRACT

A device, system and method of use for the relative navigation in a fluid medium, the device having a receiver and a controller, the receiver capable of receiving signals through the fluid medium. The signals, produced by a source, are capable of undergoing Doppler shift, and the controller is capable of determining the Doppler shift of the signals and determining the bearing between the device and the source of the signals. The system further having a first vehicle capable of producing the signals and a second vehicle having the device and wherein the device determines the bearing of the second vehicle in relation to the first vehicle.

16 Claims, 5 Drawing Sheets

(56) References Cited

U.S. PATENT DOCUMENTS

| | | | |
|---|---|---|---|
| 5,894,450 A | 4/1999 | Schmidt et al. | |
| 6,867,731 B2 | 3/2005 | Dizaji | G01S 7/292 |
| | | | 342/159 |
| 7,139,647 B2 | 11/2006 | Larsen | |
| 7,760,587 B2 | 7/2010 | Abbot | G01S 15/876 |
| | | | 367/131 |
| 7,859,944 B2 | 12/2010 | Zhou et al. | |
| 7,953,326 B2 | 5/2011 | Farr | H04B 13/02 |
| | | | 398/104 |
| 8,018,794 B2 | 9/2011 | Thierry | G01S 5/18 |
| | | | 367/120 |
| 8,403,105 B2 | 3/2013 | Lee | G01S 5/22 |
| | | | 181/125 |
| 8,670,293 B2 | 3/2014 | Morozov | H04B 11/00 |
| | | | 367/176 |
| 8,767,511 B2 | 7/2014 | Pennec | G01S 15/74 |
| | | | 367/128 |
| 8,842,498 B2 | 9/2014 | Cahalan | G01S 3/808 |
| | | | 367/134 |
| 8,908,475 B2 | 12/2014 | Napolitano | G01S 1/807 |
| | | | 367/125 |
| 8,953,944 B2 | 2/2015 | Machado | H04B 13/02 |
| | | | 398/104 |
| 9,231,708 B2 | 1/2016 | Farr | H04B 13/02 |
| 9,294,201 B2 | 3/2016 | Farr | H04B 13/02 |
| 9,444,556 B1 | 9/2016 | Cahalan | G01S 3/808 |
| 9,503,202 B2 | 11/2016 | Cahalan | H04B 13/02 |
| 9,681,220 B2 | 6/2017 | Delikaris-Manias | H04R 1/08 |
| 9,689,958 B1 | 6/2017 | Wild | G01S 3/802 |
| 10,184,797 B2 | 1/2019 | Georgy | G01C 21/165 |
| 2005/0219950 A1 | 10/2005 | Rowe | G01S 5/0226 |
| | | | 367/118 |
| 2008/0165617 A1* | 7/2008 | Abbot | G01S 11/14 |
| | | | 367/3 |
| 2008/0239874 A1* | 10/2008 | Kemp | F42B 19/01 |
| | | | 367/131 |
| 2009/0216444 A1 | 8/2009 | Crowell | G01S 19/14 |
| | | | 701/469 |
| 2011/0038230 A1 | 2/2011 | Napolitano | G01S 5/26 |
| | | | 367/127 |
| 2011/0141853 A1 | 6/2011 | Megdal | G01S 5/30 |
| | | | 367/117 |
| 2011/0273958 A1 | 11/2011 | Xia | G01V 1/3817 |
| | | | 367/21 |
| 2011/0279366 A1 | 11/2011 | Lohbihler | H01H 13/88 |
| | | | 345/157 |
| 2013/0006574 A1 | 1/2013 | Nicholson | G06T 7/277 |
| | | | 702/142 |
| 2013/0335270 A1 | 12/2013 | Edelmann | G10K 11/341 |
| | | | 342/372 |
| 2014/0104108 A1* | 4/2014 | Holford | G01S 5/021 |
| | | | 342/385 |
| 2014/0248058 A1 | 9/2014 | Simpson | H04B 10/112 |
| | | | 398/104 |
| 2014/0269201 A1 | 9/2014 | Liu | H04B 11/00 |
| | | | 367/131 |
| 2016/0071526 A1 | 3/2016 | Wingate | G01S 3/802 |
| | | | 704/233 |
| 2016/0127042 A1 | 5/2016 | Farr | H04B 10/11 |
| | | | 398/104 |
| 2016/0161589 A1 | 6/2016 | Benattar | G01S 3/803 |
| | | | 367/129 |
| 2016/0227298 A1 | 8/2016 | White | H04L 7/0041 |
| 2016/0334793 A1 | 11/2016 | Celikkol et al. | |
| 2016/0355247 A1 | 12/2016 | Ibn Seddik | |
| 2017/0176188 A1 | 6/2017 | Georgy | H04W 72/042 |
| 2017/0227638 A1 | 8/2017 | Nicoletti | G01S 15/89 |
| 2017/0317765 A1 | 11/2017 | Morris | H04L 1/0001 |
| 2017/0332156 A1 | 11/2017 | White | H04L 7/0008 |
| 2018/0145770 A1 | 5/2018 | Oelze | H04B 13/005 |
| 2019/0007195 A1 | 1/2019 | Udovydchenkov | G01V 1/3852 |
| 2019/0204430 A1* | 7/2019 | Schmidt | G01S 3/803 |
| 2022/0236437 A1* | 7/2022 | Van Vossen | G01S 15/32 |

OTHER PUBLICATIONS

Kepper, James H., IV, MEMS IMU Navigation with Model Based Dead-Reckoning and One-Way-Travel-Time Acoustic Range Measurements for Autonomous Underwater Vehicles, Masters Thesis, Sep. 2017, Mass. Inst. Technology & Woods Hole Oceanographic Inst.

Jakuba, M.V. et al., Feasibility of Low-Power One-Way Travel-Time Inverted Ultra-Short Baseline Navigation, Oceans 2015, pp. 1-10, Proc. IEEE/MTS Washington, doi: 10.23919/OCEANS.2015.7401992.

Viquez, O.A. et al., Design of a General Autonomy Payload for Low-Cost AUV R&D, 2016 IEEE/OES Autonomous Underwater Vehicles (AUV), 2016, pp. 151-155, doi: 10.1109/AUV.2016.7778663.

Fischell, N.R. et al., Relative Acoustic Navigation for Sensing with Low-Cost AUVs 2016 ICRA.

J. Collins, D.R. McGaughey, J.A. Theriault, and S. Pecknold "Torpedo Detection using Multi-path Signals and Fast Orthogonal Search Techniques", Apr. 2005, The Journal of the Acoustical Society of America 117(4) DOI:10.1121/1.4776851.

S. A. Moore, J. Le Coz, D. Hurther, A. Paquier, "Using multi-frequency acoustic attenuation to monitor grain size and concentration of suspended sediment in rivers" The Journal of the Acoustical Society of America 133, 1959 (2013); doi: 10.1121/1.4792645.

Perry Naughton, Philippe Roux, Curt Schurgers, Ryan Kastner, Jules S. Jaffe, and Paul L. D. Roberts, "Self-localization of a mobile swarm using noise correlations with local sources of opportunity" The Journal of the Acoustical Society of America 144, 2811 (2018); doi: 10.1121/1.5070154.

* cited by examiner

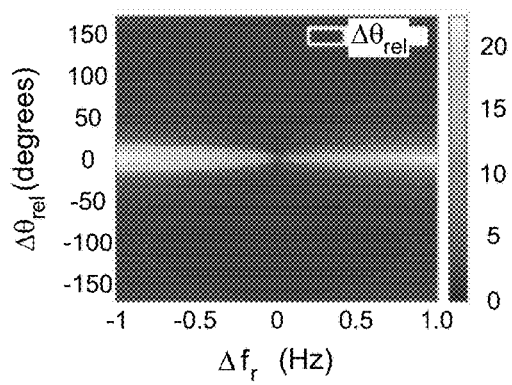
FIG. 3A
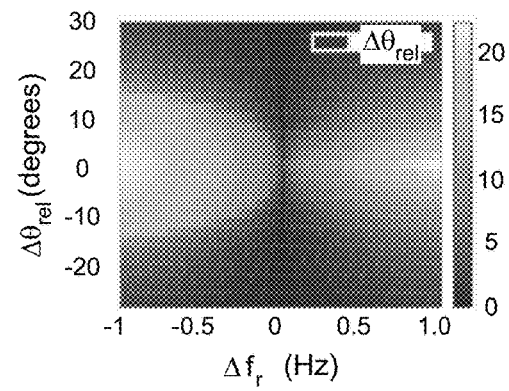
FIG. 3B
FIG. 4
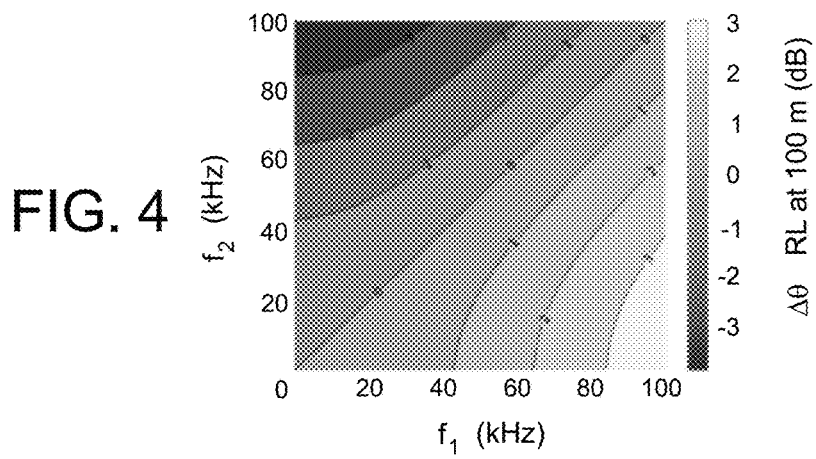
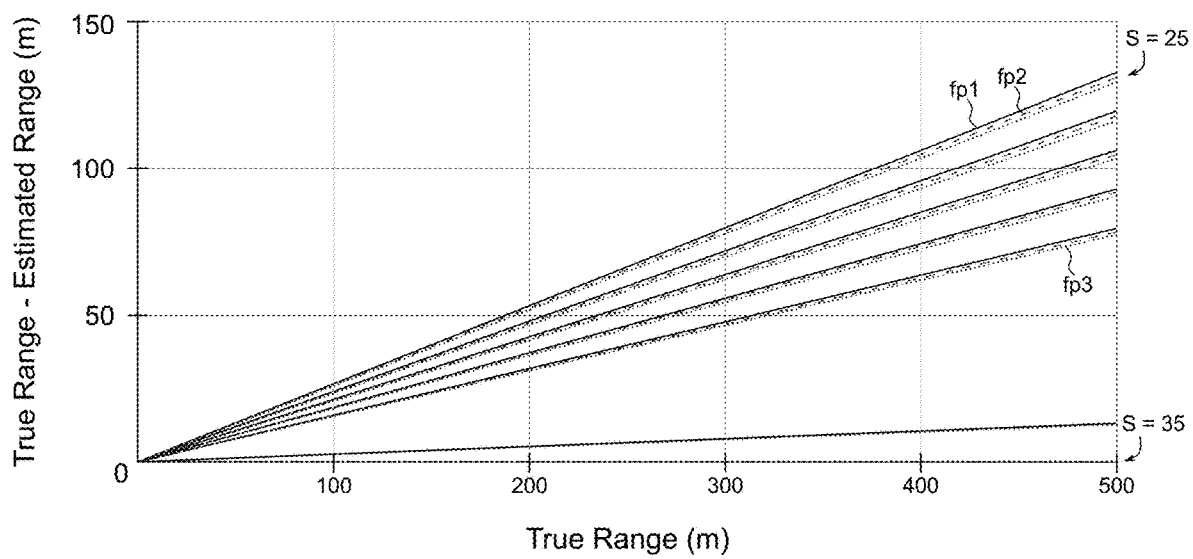
FIG. 5

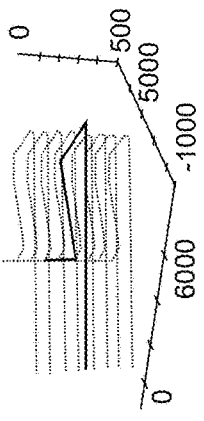
FIG. 6A
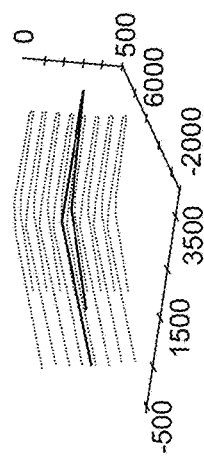
FIG. 6D
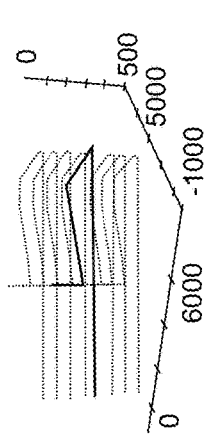
FIG. 6B
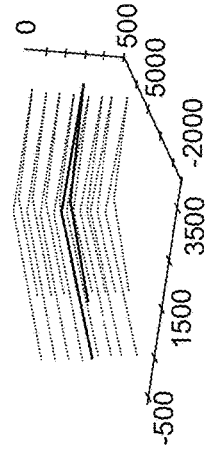
FIG. 6E
FIG. 6C
FIG. 6F
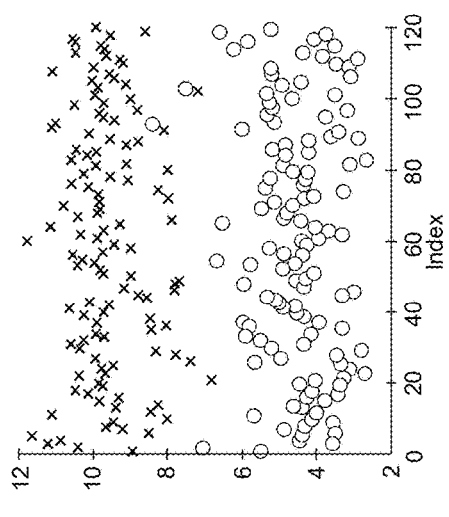
FIG. 6G
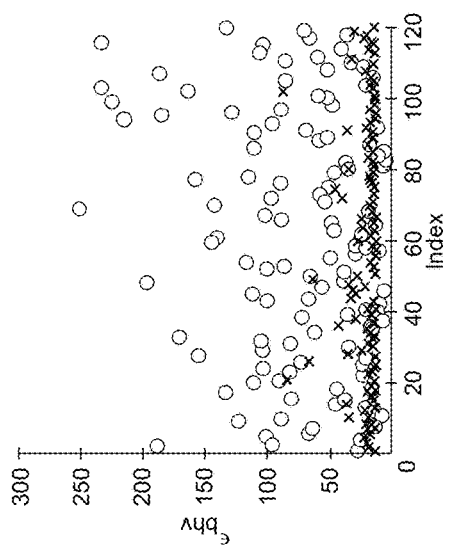
FIG. 6H

DOPPLER SHIFT NAVIGATION SYSTEM AND METHOD OF USING SAME

CROSS-REFERENCE TO RELATED APPLICATION

This application claims benefit to U.S. Provisional Patent Application No. 62/910,763, filed Oct. 4, 2019, the disclosure of which is hereby incorporated by reference in its entirety.

FIELD OF THE INVENTION

This invention relates to submerged navigation without the continuous aid of a global coordinating system. More particularly, this invention relates to underwater relative navigation of at least one vehicle navigating within a relative reference frame of a source, providing a simpler and cheaper navigation solution for underwater use.

BACKGROUND OF THE INVENTION

Swarms of robots are starting to appear in aerial and ground robotics across multiple operational domains, including for search-and-rescue, mapping, or Olympic light shows, demonstrating that large groups of drones can be coordinated and controlled. This capability does not currently extend to the underwater domain, for a reason of basic physics: the attenuation of light in water is 10 orders of magnitude greater than that in air, rendering terrestrial robotics' navigation and communication technologies ineffective. Underwater, environmental, and physical factors severely limit navigation and communication techniques, but, most swarming algorithms assume either near-perfect navigation or near-perfect communication, and neither is possible underwater. As a result, prior work in multi-AUV navigation and coordination in the real world is largely dependent on centralized direct control and absolute positioning. One attempt at single beacon, relative navigation was recently described in U.S. Patent Application Publication 2019/0204430 A1, incorporated herein in its entirety. However, this solution requires an expensive, extremely precise clock that results in parts costs of several thousand dollars per vehicle.

The above limitations have made autonomous underwater vehicle (AUV) navigation either expensive or unwieldy, requiring high-power sensors such as inertial navigation sensors (INS) that cost hundreds of thousands of dollars, frequent surfacing for GPS, or the deployment of geolocated acoustic beacons, limiting the swarm's operational area, which is a severe constraint given the scale of oceanographic sensing.

Ideally, a "swarm" of underwater vehicles would have inexpensive vehicles, a navigation and communication scheme that allows vehicles to remain together in an area while performing a mission, and a multi-vehicle command and control scheme. The first technology is emergent, but challenges remains in developing a low-cost solution that keeps scalably large numbers of AUVs together in some kind of swarm or formation while collecting oceanographic data. Additionally, an intuitive user interface that makes it possible for an operator to deploy, command, and recover large numbers of vehicles together is also needed.

The ocean is complex and variable in four dimensions (4D): latitude, longitude, depth, and time. Given the large size of the ocean, and the fact that many features of interest to oceanographers have been shown to vary at the sub-mesoscale times of days to weeks, multiple agents are required to fully understand crucial oceanographic processes, for example, heat and mass transfer. An ideal way to capture the complex, 4D nature of the ocean would be to use tens or hundreds of robots or AUVs to take measurements in a bio-inspired swarm or formation, getting simultaneous, synchronized measurements over a volume.

Bio-inspired swarms or formations are now appearing in aerial, ground, and sea surface robotics; however, swarming has yet to be demonstrated underwater for the simple reason that underwater navigation and communication are not scalable to tens or hundreds of AUVs. Historically, AUVs cost hundreds of thousands to millions of dollars, and while vehicles costing thousands to tens of thousands of dollars are now available, that lower cost comes with tens of meters of navigation drift per minute and consequentially a need for frequent surfacing to regain an absolute position fix. This combination of factors means that coordinated operation of tens or hundreds of AUVs has not been fully realized.

It is therefore desirable to establish a low-cost navigation and communication hardware and software system and method. Herein described is a system using single source to inform relative navigation of a plurality of autonomous vehicles.

SUMMARY OF THE INVENTION

One object of the present invention is a low-cost, relative navigation system using a single-transducer system adapting Doppler-shifted frequency to inform heading, and in some cases, multi-frequency difference in absorption to inform range without time-synchronization for multi-vehicle swarming. In one embodiment, a leading vehicle (leader) with a source beacon is assumed to have accurate navigation, and a group of following vehicles (followers) adapt speed and heading to remain with the leader using data available from a single hydrophone, with no time synchronization. Received frequency and the difference in received pressure at two different frequencies may also be used to inform on range between follower and leader. Embodiments using this solution to submerged navigation, a leader with good navigation carries a multi-frequency sound source. Scalable numbers of followers equipped with a custom low-cost acoustic package then adapt heading based on Doppler-shifted frequency and may also use multi-frequency difference in absorption.

One aspect of this invention is a device for determining the bearing towards a source of signals in a medium having a receiver, a controller, and a connector. The receiver is adapted to receive signals as they travel through the medium, the receiver is interconnected to the controller, and configured to send information pertaining to the first signals to the controller. The controller is configured to receive the information, and to determine the Doppler shift of the received signals, as well as determine the bearing between the receiver and the source of the signals before they traveled through the medium. The connector is connected to the controller and is configured to connect to a separate device and send the information relating to at least one of the following list: the signals, the Doppler shift, or the bearing. In some embodiments, the device also has a pressure housing the encloses the controller and at least a portion of the receiver and connector protrude out of the pressure housing, which is configured to exclude the medium from the interior space of the housing. In some cases, the separate device is a vehicle and in further cases the separate device is selected from the group of: a ship, boat, barge, or other human-occupied vehicle, AUV, ROV, UUV, submarine, or other submerged craft. In some cases, the separate device is an AUV. In some embodiments the device receives signals having two frequencies. In some embodiments, the signals have two sets of two frequencies, each two frequencies of each frequency set being spaced apart by at least a factor of ten (i.e. 10 kHz and 1 kHz).

Another aspect of the present invention is a system for relative navigation in a medium, the system having a first and a second vehicle. The first vehicle having a source configured to emit signals capable of traveling through the medium. The second vehicle having a receiver interconnected with a controller, the receiver configured to detect at least a portion of the signals as they travel through the medium, and the controller is configured to receive information on the signals from the receiver and determine the Doppler shift of the signals as well as the bearing between the first and second vehicles.

In some cases, the signals have two frequencies, and the controller of the second vehicle receives information relating to the two frequencies from the receiver, and the controller determines the absorption of the two frequencies to determine the range between the first and second vehicles. In some cases, the first vehicle also includes a controller; and in more cases the first vehicle also includes a receiver interconnected to its controller, and the first vehicles' receiver is configured to detect signals traveling through the medium. In some cases, the second vehicle includes a source, and this source is configured to emit second signals that travel through the medium. Here, the first vehicle's receiver is configured to detect the second signals and send information on the second signals to the first vehicle's controller, which is then configured to determine Doppler shift on the second signals and the bearing the first vehicle in relation to the second vehicle. In further cases, the system has a third vehicle having an interconnected receiver and controller, both configured as for the vehicles above. The third vehicle's controller may calculate Doppler shift of both the signals and second signals and determine the bearing of the third vehicle relative to (i) the first vehicle and (ii) the second vehicle.

In some cases of the system aspect, the second vehicle's controller provides information relating to the first vehicle's relative bearing through the medium to the first vehicle. In some of these cases, the system further has a fourth vehicle having a source configured to produce third signals that travel through the medium; and the second vehicle's receive is configured to receive these third signals, and its controller is configured to determine Doppler shift of the third signals and the bearing of the second vehicle relative to the fourth vehicle.

Another aspect of the present invention is a non-transient computer readable medium containing program instructions for causing a computer to perform the method of receiving information from a receiver on first signals that traveled through the liquid medium, the signals having a first frequency and having been emitted from a source, determining frequency shift by comparing the received signal's first frequency with a reference frequency, and calculating the bearing of the receiver relative to the first signals' source using the frequency shift. In some cases, calculating the frequency shift involves calculating the Doppler shift of the first signals using the frequency shift and calculating the relative bearing also using the Doppler shift.

In some cases, the program instructions for performing the method includes obtaining velocity information. In some cases, the velocity information is obtained by iterating a velocity search across possible velocities, or by iterating through a velocity model. In other cases, the velocity information is received by a velocity mechanism. In some cases, the bearing calculation uses the Doppler shift and the velocity information.

In some cases the program instructions for performing the method includes receiving additional first signals through the medium by the receiver, the additional first signals having a first frequency and being emitted from said source, determining a second frequency shift by comparing the first frequency of the additional first signals and the reference frequency, determining a maximum frequency shift by taking the larger of the first and second frequency shift, and where the step of calculating the relative bearing uses the maximum frequency shift in place of said frequency shift. In some cases, the program instructions for performing the method includes the step of calculating Doppler shift of the first frequency of the additional first signals and the reference frequency. In some cases, the reference frequency is predetermined. In other cases, the reference frequency is determined or identified algorithmically.

In some cases, the program instructions for performing the method includes recording the first signals over a period of time, creating a plurality of samples. And in some cases, the program instructions for performing the method includes dividing each sample of the plurality of samples into at least two sub-samples, where the first signal is limited to the first sub-sample. In some cases, the second sub-sample has a baseline signal where the baseline signal has no first signal emission within it, only background noise.

In some cases, the first signals have a second frequency and the step of receiving the first signals includes receiving the second frequency. In some of these cases, the program instructions for performing the method includes determining a first and second received signal level of the first and second frequencies of first signals, estimating a first and second absorption of the first and second frequencies, and estimating the range between the receiving and the first signals' source using the first and second received signal levels and the first and second absorptions. In some cases, the step of estimating the range uses the difference of the first absorption and the second ab sorption.

In some cases, the range is estimated with equations using estimates of source signal levels, and noise levels. In some cases, the range is estimated using a function of errs in noise estimates and errors in source level estimates. In some cases, the program instructions for performing the method further includes the steps of receiving, from the receiver, baseline signals have a first and a second frequency, where the baseline signals are received during periods of time that source is not emitted the first signals; said another way, the baseline signals represent a set of sub-samples of samples that do not contain the first signals and the first signals are limited to a second set of sub-samples; in this case the program instructions for performing the method concludes with the step of estimating the noise levels using the first and second frequencies of the baseline signals.

In some cases, the program instructions for performing the method includes the steps of instructing a change in heading of the receiver and where the preceding step is performed before the step of receiving additional first signals, above. In some cases, the program instructions for performing the method includes the step of estimating a relative position of the receiver, relative to the source using the range and bearing. In some further cases, the relative position is given units of x and y in a coordinate frame. In some cases, the program instructions for performing the method includes the step of reconstructing an absolute position of the receiver using the relative position and a known position of the first signals' source. In some further cases, the absolute position is given in units of x and y in a coordinate frame. In some cases, the program instructions for performing the method includes the step of receiving a heading from a heading mechanism, and where the step of calculating bearing uses a single numerical integrating differential equation using the first frequency and the heading.

Another aspect of the present invention is a method of relative navigation in a medium, having the steps of selecting a first vehicle that has a first source configured to produce a plurality of first signals, those signals are adapted to travel through the medium, selecting a second vehicle that has an interconnected receiver and controller, the receiver configured to receive at least some of the first signals, placing the first and second vehicles in the medium, producing a plurality of signals from the source, moving one of the first or second vehicles, detecting, with the receiver, the first frequency of at least a portion of the signals, producing a first detected frequency, determining Doppler-shift with the controller using the first detected frequency, and determining bearing of the second vehicle relative to the first vehicle by using the second vehicle's controller.

In some cases, the method includes the first signals having a second frequency, and the second vehicle's receiver and controller receives the second frequency and information relating to the second frequency, respectively. The second vehicle's controller further determines a first and second absorption of the first and second frequency and determines range between the first and second vehicles based on the first and second frequency. In some methods, the first vehicle also has a controller and receiver, the controller connected to the receiver and the source, the first vehicle is configured to detect signals traveling through the medium. In some methods, the second vehicle has a source interconnected to its controller, the source is configured to emit second signals into the medium. Some further methods include the step of emitting second signals having a first frequency into the medium by the second vehicle's source, receiving the second signals by the first vehicle's receiver, producing a second detected frequency of the second signals, determining a second frequency shift of said second signals by comparing the second detected frequency and a second reference frequency, and determining a bearing of the first vehicle relative to the second vehicle.

Some methods include the step of selecting a third vehicle having an interconnected receiver and controller, the receiver configured to receive detect signals in the medium, placing the third vehicle in the medium, detecting, by the third vehicle's receiver the first and second signals, producing a third and fourth detected frequencies of the first and second signals, respectively, determining a third frequency shift by comparing the third detected frequency and the first reference frequency and a fourth frequency shift by comparing the fourth detected frequency and a second reference frequency, and determining a bearing of the third vehicle relative to the first vehicle using the third frequency shift and a bearing of the third vehicle relative to the second vehicle using the fourth frequency shift.

Some methods include the steps of providing information, by the second vehicle, relating to the bearing of the second vehicle relative to the first vehicle to the first vehicle. Some methods include the step of providing information, by the third vehicle, relating to the bearing of the third vehicle relative to the second vehicle to the first vehicle. Some methods include the step of obtaining, by the second vehicle, velocity information. In some methods, the velocity information is obtained by iterating a velocity search across possible velocities, or by iterating through a velocity model. In some methods, the velocity information is received from a velocity mechanism. In some methods, the step of determining bearing further uses the velocity information.

Some methods include the steps of moving the second vehicle and receiving additional first signals having a first frequency, determining, with the second vehicle's controller, a second frequency shift by comparing the first frequency of the additional first signals and the reference frequency, determining, with the second vehicle's controller, a maximum frequency shift by selecting the larger of the first and second frequency shifts, and wherein the step of calculating the bearing of the second vehicle relative to the first vehicle uses the maximum frequency shift in place of the first frequency shift.

The hardware and autonomy software used to achieve swarming is presented, along with the efficacy of this technique under different simulation conditions, and preliminary field results with prototype low-cost hardware.

BRIEF DESCRIPTION OF THE DRAWINGS

In what follows, preferred embodiments of the invention are explained in more detail with reference to the drawings, in which:

FIG. 2B shows an angle $\theta_{rel}$ describing the angle between follower and leader and angle $\theta_r$ describing an arbitrary relative north and the heading of follower $v_{ri}$.

FIGS. 3A and 3B illustrate the sensitivity of estimated angle to precision of frequency measurement versus relative angle for a 100 kHz signal, with a 1.4 m/s follower and a 1.2 m/s leader. Full range of angles are shown in FIG. 3A and zoom between −30 and 30 degrees angle are shown in FIG. 3B.

FIG. 4 illustrates the difference in receive level between two frequencies $f_1$ and $f_2$ assuming identical transmission loss over a distance of 100 m.

FIG. 5 illustrates range estimation error for three different frequencies pairs ($f_1/f_2$), 100 kHz/20 kHz, 60 kHz/20 kHz, and 60 kHz/45 kHz at true ranges of 0 to 500 m for salinity errors. The quantity of range error is small between the different frequency pairs, with a slight increase in range error for the frequencies that are closer together.

FIGS. 6A-6F are illustrative examples of randomly seeded paths with leader marked in dark black and followers marked in lighter, dotted lines, with $\varepsilon_{bhv}$ and $\sigma_{bhv}$ results shown in FIGS. 6G and 6H, respectively.

DEFINITIONS

Figure 1A:
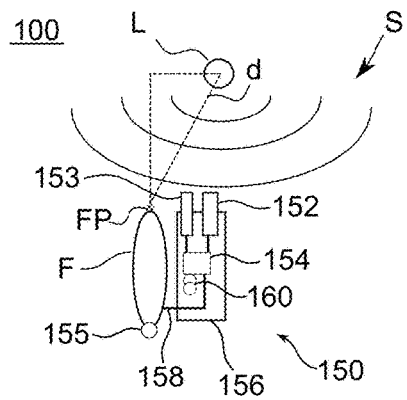
FIG. 1A is a top-view schematic illustration of the relative position of a leader and a follower vehicle having a navigation package, according to one embodiment of the present invention; leader, follower, and follower's navigation package are simplified and not drawn to scale.

For the purpose of this disclosure, an "absolute navigation mechanism" 114 provides an absolute location, often latitude and longitude coordinates of the current location to an attached vehicle, controller or other object. A GPS system uses satellites to determine a spot with respect to the earth's reference, producing an absolute location and is therefore an example of an absolute navigation mechanism 114.

For the purpose of this disclosure, the term "follow position" abbreviated FP, is used to denote the relative spatial relationship between a leader L and a follower F, meaning the three dimensional position, including distance, orientation (i.e. heading) and the like.

The term "follow" is to be understood as inclusive, the term including maintaining a fixed distance between two vehicles, the approach of one vehicle to an object (stationary or moving slower than the approaching vehicle), relative navigation of a follower F in relation to a leader L without the approach of the follower towards the leader, and even including a follower vehicle moving away from the leader and increasing the distance between the two vehicles.

The term "follower" is used herein generically to refer to a movable object that is capable of detecting signals traveling through the fluid medium and determining the signals' Doppler shift. The follower is not required to move towards the source of the detected signals, but in almost all embodiments the follower is capable of such approaches.

The term "leader" is used herein generically to refer to an object capable of creating signals that travel through the medium. In some embodiments the leader is mobile, however in other embodiments the leader is stationary, or unable to move by itself. The leader is not required to lead other vehicles or objects through the medium, but in many embodiments the leader is capable of such action.

The term "hybrid" is used herein to refer to an object that may act as either a leader L or follower F. A hybrid H vehicle may alternate between acting as a leader L and follower F or may act as both leader L and follower F simultaneously.

For the purpose of this disclosure, the term "vehicle" is any controllable object that can physically move through the desired medium, including floating on top of the medium, or navigating through the medium (i.e. submerged). The vehicle can be any appropriate object, as commonly known in the art, including but not limited to a ship, boat, barge, or other human-occupied vehicle, AUV, ROV, UUV, submarine, or other submerged craft.

The term "reference frequency" as used herein refers to a known or determined source frequency that has not been affected by the Doppler effect. The reference frequency may be a predetermined source frequency, either set manually or algorithmically. The reference frequency may be algorithmically identified or estimated through a method disclosed herein or known in the art. The reference frequency may be a steady tone or a pattern of tones of a passive source or predetermined and known to change in frequencies, and the like.

DETAILED DESCRIPTION OF THE PRESENTLY PREFERRED EMBODIMENTS

Overview

This invention may be accomplished by a system capable of exploiting the physical property of Doppler shift of energy waves (e.g. sound), and in some embodiments, the frequency-dependent absorption of energy (e.g. sound) in a medium, most often a fluid medium (e.g. water). One such system includes a first vehicle, a leader L, having a source 112, most often a transducer or pinger that is configured to produce a plurality of first signals S that travel through the medium (a body of fluid, most often the ocean), and a second vehicle, a follower F, having a receiver 152 and controller 154. The receiver 152 serves to detect at least some of the signals S transmitted through the medium, and the controller 154 is connected to and receives information from the receiver 152. The controller 154 then determines Doppler shift, attenuation, or both Doppler-shift and attenuation of the detected signals S, to determine at least one of the heading and range of first vehicle L relative to second vehicles F.

The Doppler Effect (referred herein as Doppler shift) describes the perceived frequency shift that occurs when a sound source and a receiver experience relative motion. The present invention provides vehicles that receive or detect signals S through the medium at the received frequency $f_r$ of sound arriving from a source 112 with a source frequency of $f_s$, from a leader L. $f_r$ varies based on the relative velocities of the leader L, denoted as $v_s$ and the follower's velocity, denoted $v_r$, as well as the normal vector connecting the leader and follower, denoted $\hat{n}_{rel}$. The present invention takes advantage of these phenomena to provide an inexpensive, relative navigation system for the submerged environment (i.e. fluid medium). A full description of the mathematical relationship between leader L and follower F is described below in the Doppler Shift Derivation section.

System 100, as illustrated in FIG. 1A, has at least one source or leading vehicle, referred herein as a leader L, and at least one receiving or following vehicle, referred herein as a follower F. A desired and adaptable relative spatial relationship is configured for the follower F to maintain between it and the leader L, referred herein as a follow position FP and a representable line between vehicles as distance d. One or both leader L and follower F may be moving objects, each with a defined velocity and velocity vector (velocity including direction). Electromagnetic energy is used to determine Doppler shift and therefore relative bearing between follower F and leader L. The electromagnetic energy, referred herein as signals S, is emitted by leader L and detected by follower F. Signals S are often emitted as a defined frequency, a set of frequencies, or sets of frequencies. Signals S are typically sound waves or, in some cases, light waves, and the follower F may maintain or adjust the follow position FP by monitoring the Doppler shift of the leader's signals S.

Doppler shift informed navigation has several advantages over current navigation systems, including but not limited to, Doppler shift of signals is not affected by salinity or by reflection or refraction off of a boundary layer in the medium, the medium surface or the medium bottom (e.g. the ocean bottom, or the bottom of a tank). The processing, or derivation, of the signals S by the follower F to establish the proper velocity and heading to maintain the follow position FP as at least one of the follower F and the leader L moves through the medium is describe in detail in the Derivation section below. In addition, follower F and leader L may switch between roles, or may act as both leader and follower simultaneously; such vehicles are referred herein as hybrid H vehicles.

Leader L

In the present invention, the leader L may be any suitable object that is capable producing signals S for a follower F to receive, through a liquid medium. Typically, the leader has a source 112 for producing signals S. In many embodiments the leader L is capable of movement or being moved through a medium. In some embodiments, leader L function as both a leader L and a follower F, either simultaneously or in turns; this ability allows another vehicle (typically a follower F) to become the leader L when the original leader L switches to follower F status. Simultaneous leading and following enables swarms within swarms, or subgroups of vehicles to follow a leader L who in turn follows another leader, which may have more than one following subgroup following a 'master' leader.

Typically, leader L will have an absolute navigation mechanism 114 (e.g. GPS) to determine where it is in absolute units. The leader L must have a mechanism to send signals S out into the medium and those signals must be capable of undergoing Doppler shift. The origin of signals S that undergo perceived Doppler shift is referred herein as the source 112, which enables the followers F to determine bearing of leader L relative to itself and to execute their defined navigation pattern in response to this determination. The source 112 will be discussed in more detail below herein.

The leader L may be any suitable object; several non-limiting examples include an AUV, an autonomous surface vehicle (ASV), a manned surface vehicle (e.g. a boat), an autonomous underwater glider (AUG), a buoy, a mooring, a towed streamer, and a submarine.

In the currently preferred embodiment, leader L comprises an AUV, comprising a watertight housing 116, an absolute navigation mechanism 114 (typically a GPS receiver), a source 112, a controller 118 (e.g. a computer board), and a propulsion mechanism 120 (e.g. a motor). The absolute navigation mechanism may be any suitable device as known in the art, including GPS receivers, acoustic positioning systems (e.g. a long baseline LBL system), INS-DVL systems (inertial navigation system with Doppler velocity log) or the like.

Source 112

Each vehicle capable of performing as a leader L comprises a source mechanism 112 configured to produce signals S that propagate through the medium and are perceived to undergo Doppler shift when detected. Typically, source 112 is an acoustic source designed for submerged operation, producing sound waves that propagate though water, undergoing Doppler shift if the relative vectors of leader L and follower F are not identical. In the currently preferred embodiment, source 112 comprises a narrow band acoustic pinger, using constant waveform output, connected to the leader's controller 118, and configured to send out periodic signals (i.e. pings) at a rate, preferably a defined rate, and at a relatively constant tone over time. In one embodiment, the source is configured to produce signals S with defined frequency or frequencies. Typically, the source 112 is capable of emitting signals S in at least one frequency best suited for the embodiment. In one embodiment, a commercially available fish pinger, with an acoustic range of 100 to 500 meters underwater (this range is only true for one emitted frequency; at other frequencies, the underwater range will either extend or decrease, depending on the frequency or frequencies used to generate the signals). In another embodiment source 112 operates at around the 15 kHz frequency range, with a range of approximately 1 to 3 kilometers. In yet another embodiment, source 112 operates at around the 25 kHz frequency range, with a shift for vehicle movement.

The exact frequency or frequencies chosen for source depends on many factors, including swarm size throughout a 3D space, vehicle speed, and the surrounding environment (e.g. saltwater vs fresh water). Source 112 power also depends on the specific embodiment, the level of decibel (dB) output is often selectable (either by a user or an autonomous algorithm), and may increase range of signal S, while increasing power consumption. The rate at which source 112 generates signals is embodiment dependent; signal generation rate may be anywhere within one signal per fraction of a second to a fraction of a minute, or once over a period of multiple minutes. Typically, the at least one signal S frequency is relatively fixed during a deployment or other specific period for an embodiment. The frequency or frequencies of signal S are preferably relatively fixed over the time scale of an adaptation. Here an adaptation is defined as the time it takes for a follower F to home in on the maximum Doppler shift, typically a time of several minutes. The at least one frequency produced by source 112 may be changed on a pre-determined basis, such that the follower is informed to which frequency a particular leader L is using. In embodiments with multiple leaders, each source will use a different frequency or set of frequencies.

It is within the scope of this invention for the source 112 to be a passively generated source. That is, an object that produces energy while performing another task (e.g. the noise of an engine-driven propeller) is a passive source 112. In this way, a ship may be a leader L and the propeller may represent the source producing signals S, or a tone, for a follower F to determine the Doppler-shift and to use to establish a follow position FP. A vehicle may further be a hybrid H, or leader L, and its source 112 may be passive if a component of that vehicle, for example the propeller is configured to emit suitable signals S.

Second Source 113

It is within the scope of the invention for a vehicle to have a second source, most often emitting a different wavelength or wavelengths on the electromangic energy spectrum, referred generically herein as wavelengths to distinguish these signals from signals S. In one embodiment, the second source 113 emits wavelengths of visible light into the medium. Visible light is rapidly absorbed in fluid mediums, however, this absorption (i.e. attenuation) can be used to calculate shorter ranges, when two vehicles are in close approach. Most often the second source 113 is accompanied by an appropriate second receiver 153 adapted to detect the wavelengths emitted by the second source 113. The second receiver 153 is typically connected to its vehicle's controller 154. Like source 112 and receiver 152, second source 113 and second receiver 153 may be in a follower F, leader L, or hybrid H vehicle.

Movement

One of the leader F or follow F must undergo relative movement for the generation of perceived Doppler shift of signals S. The motive force may be provided by any suitable means as known in the art. In one embodiment, at least one of the leader L and the follower F is moved by a motor, in another embodiment at least one of the leader L and the follower F is towed behind a separate vehicle and that separate vehicle is moving. In yet another embodiment, at least one of the leader L and the follower F is free-floating and is moved through the medium by currents, a sail, or a buoyancy engine.

Follower F

The present invention provides for at least one follower F, which may follow at a prescribed distance, with a prescribed vector in three-dimensional space, in relation to the leader L. For simplicity this space, or position, is referred herein as the follow position FP (illustrated as a solid grey circle in FIGS. 1A and 1B), and includes the distance d in 3D space between follower F and leader L, and the vector $\vec{v}_r$ (i.e. heading) of the follower (i.e. angle of movement the follower F is set on). In embodiments with more than one leader L, a follower F will have a follow position FP that is relative to both leaders L1 and L2. Establishing follow position FP velocity, broadly stated to correct for range, and heading, broadly stated to correct for angle, are described in detail in the Derivation section. Follow position FP may be static in relation to the leader L over time (i.e. following a moving leader) or may change over time. Follow positions FP that change as a unit of time are useful for the follower F to do many different tasks, for example surveying a region of space relative to the leader (i.e. doing a 'mow-the-lawn' operation, FP will change as the follower F mows), or may be cha to conduct a mission step, for example approach a stationary leader L.

Followers F comprise a self-propelled vehicle, typically an AUV, with at least one receiver 152 (e.g. a hydrophone), a controller 154, and propulsion mechanism 155. The follower F inherently have a heading (i.e. velocity vector) $\vec{v}_r$ resulting from its movement. Typically, followers F may rely on a single receiver 152 to determine Doppler shift of the received signal S, and therefore the system described herein is advantageous over other systems known in the art that require a multiplicity (e.g. more than one) of receivers to determine the direction in 3D space of a source. Furthermore, the currently preferred embodiment relies only on one-way signal S travel, from leader L to follower F. No signal is required to be produced or reflected from the follower F and sent to the leader L, enabling a vehicle swarm to be larger in number because only one signal is needed per leader L. Systems with two-way signals have limited bandwidth of frequencies available to each follower, and the leader would need to have a receiving mechanism capable discerning each follower's signals.

Velocity Mechanism

Some embodiments of the present invention include at least one means to determine vehicle velocity or, in some instances speed, referred herein as the velocity mechanism. The velocity mechanism determines information pertaining to the movement or speed of the vehicle, referred herein as velocity information, and typically relays that information to a controller. The controller may be controller 154 or a separate vehicle controller, interconnected to controller 154. In some cases, the velocity mechanism is a GPS device, a mechanism tracking propulsion mechanism action, or other means as known in the art. In some embodiments the velocity information is estimated or modeled though computer programming, including a search of possible vehicle or navigation package (i.e. 'device') speeds, or using a model of vehicle or navigation package speeds. In some, less preferred cases, the velocity mechanism is an acoustic Doppler current profiler ADCP which determines a vehicles' velocity and position relative to the ocean floor or fluid boundary layer.

Heading Mechanism

In some embodiments, a vehicle or navigation package 150 comprises a means of determining a heading, referred herein as the heading mechanism. The heading mechanism may be any solution as known in the art, for example, in one embodiment the heading mechanism comprises an electronic compass connected to a controller.

Navigation Package 150

In one embodiment of the present invention, a follower is modified to include a navigation package 150, comprising a receiver 152, for example a RESON hydrophone commercially available from Teledyne Marine. The hydrophone is then connected to a controller; most often a dedicated controller 154 located within navigation package 150, but in some, less preferred embodiments, to the follower's main controller. In either case, the controller is programmed, in part, according to the Derivation section disclosed below herein, and is in communication with the follower's F movement control software and hardware, as known in the art.

The navigation package 150 may be incorporated into the follow's flooded or pressurized compartments, as known in the art. In another embodiment, illustrated in FIG. 1A, the navigation package 150 comprises a housing 156 containing a controller 154 and supporting a receiver 152, which may have portions within and without housing 156. In this embodiment, navigation package 150 further comprises a connection 158 enabling the navigation package to connect, at least informationally, to follower F, or another object; As an example, connection 158 may be a standard RS-322 connection. Connection 158 is adapted to transfer any information and commands, referred generically as information output, available to controller 154 to the attached object. Connection 158 may also accept commands and information from the attached object, and its controller, and transfer those commands and information to controller 154. Additionally, connection 158 may be configured to provide power to the navigation package 150 if the navigation package does not include an independent power source 160. The navigation package 150 may then inform the attached vehicle or another device, of the received signals S as they propagate from one or more leaders L through the medium. Such a package would be widely adaptable for many different types of vehicles and could be made to be plug-and-play with standardized connections and output data.

In yet other embodiments, navigation package 150 may comprise an interconnected source 112, enabling the connected vehicle to alternate between leader L and follower F functions, referred herein as a hybrid H vehicle, and discussed in more detail below.

Controller

The present invention provides for a digital control device, referred herein as the controller 154. In some embodiments, the controller is within a vehicle (and may be included in followers, leaders and hybrid vehicles), or within a navigation package device 150. The controller is configured to perform many of the determinations, estimations and calculations disclosed elsewhere herein. The controller may be any control device as known in the art. Often the controller is a single board computer. Controllers are referred generically herein, and their function may pertain to a controller in any vehicle or package.

In some embodiments the controller 154 has information and programing stored on computer readable medium (abbreviated CRM). The CRM is most often non-transitory, that is the information is not encoded on transitory signals. The CRM may be encoded onto a physical piece of memory, for example a CD-rom, a flash drive, a single board computer, and the like, as long as it is substantially permanent that the information encoded therein (i.e. programmed steps or firmware) may be carried out on an applicable navigation package device 150, or system 100. The mathematical equations and steps disclosed herein to determine relative bearing between a receiver 152 and source 112, determine range between receiver 152 and source 112, and other calculations disclosed herein may be executed by a computer that accesses or retrieves code stored in a non-transient computer readable medium of a computer program product.

Some of the commands stored on the CRM indirectly instruct a change in heading or orientation of a competent, for example receiver 152 or source 112. In most embodiments, the command is enacted through the vehicle by changing control surface altitude or orientation (e.g. a vehicle's control fins), or propulsion mechanism 120, which in turn induces the desired change in the component. It is to be understood that a command instructing a change in heading or position of a navigation package 150 or receiver 152, will act on other components as would be readily understood by one skilled in the art.

Swarm Compositions

The present invention may be performed as a simple single leader L, single follower F relative navigation system, where an informed leader L (here informed refers to the leader knowing its absolute location or is in the correct location) is located in a fluid medium and enables a follower F to establish at least one desired follow position FP relative to said leader L. In a variation of this simple implementation, the leader L may be fixed in position and the follower F may have a route or set of follow positions set relative to the leader L that it executes. Routing of the follower F may be performed by determining the leader's location over time, with the follower F moving to obtain different degrees of Doppler shift for each follow position FP, in turn.

Figure 1B:
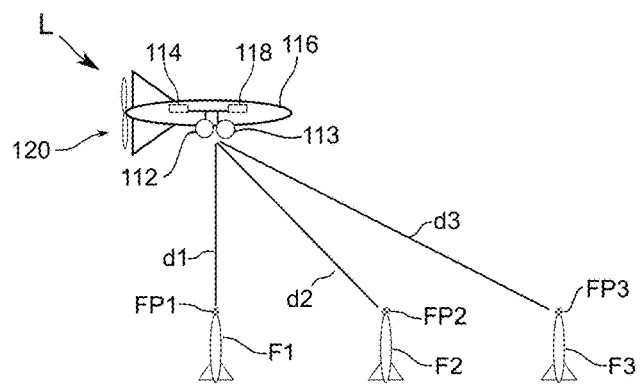
FIG. 1B is an illustration of the relative position between one leader vehicle and three follower vehicles according to one embodiment of the present invention.

This invention, however, is especially well suited for more complex vehicle arrangements, defined herein as swarms. Vehicle swarms may comprise a single leader L with a single source 112 enabling multiple (2 or more) vehicles to navigate relative the leader L, each vehicle (followers) following at a prescribed follow position FP. Illustrated in FIG. 1B is a simple swarm system 100 comprising a single leader L and three followers F1-F3, each follower with a set follow position FP1-FP3 set in relation to leader L and each having a distance d1-d3 in three dimensional space between itself and leader L. The present invention enables many followers to follow a single leader L, and it is to be understood that the illustrations provided herein depict limited numbers of followers and leaders for simplicity and that there is almost no theoretical limit to the number of vehicles in a swarm. Preferably more than two to several hundred followers could be incorporated into a swarm.

Figure 1C:
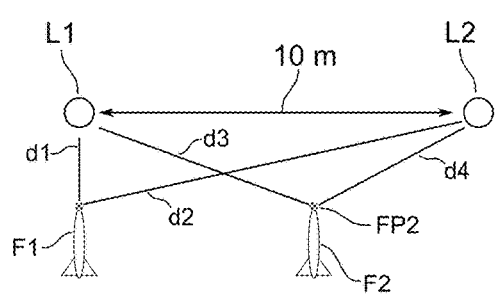
FIG. 1C is an illustration of the relative position between two leader vehicles and two follower vehicles according to one embodiment of the present invention.

Another simple swarm is illustrated in FIG. 1C, the swarm having two leaders L1 and L2 and two followers F1 and F2. In swarms with more than one leader L, each follower may have set headings and therefore a follow position relative to more than one leader L. For example, follower F2 has a follow position of FP2, with a distance d3 to leader L1 and a distance 1:14 to leader L2. Likewise, as disclosed in the derivation section below, follower F2 would have a heading and vector that maintains its relationship at FP2 to both leader L1 and leader L2, as the swarm performs relative movement through the medium. Not illustrated but enabled by the present invention are larger swarms with more than two leaders and more than two followers. Such swarms are possible as long as the leader's source 112 has the frequency and output power for a signal S to travel the distance to the farthest follower F that must maintain a follow position FP to that particular leader L. It is possible for some followers in a swarm to maintain a follow position FP to only a subset of leaders, enabling a swarm to spread out over an area (e.g. a long linear line) were portions of the swarm's followers are not receiving signals S from the leaders on other side of the swarm. It is also within the scope of the invention for a hybrid vehicle H to follow a leader or multiple leaders in a swarm, while simultaneously producing signals S for other followers to navigate relatively to at least the hybrid H in the same swarm. The followers that follow the at least one hybrid H can be thought of as a subswarm within the greater swarm.

It should be noted the term "follow" as used herein includes the approach to a stationary object, for example a follower F approaching a stationary leader L. The term "follow" further includes relative navigation of a follower F in relation to a leader L, therefore when a follower is said to follow a leader that includes moving to a set of waypoints that does not necessarily lead to or follow along with a leader L.

In many embodiments, a single vehicle may be a hybrid H vehicle, configured to act as either a leader L or follower F. And a plurality of vehicles in a single swarm may be configured have this switching ability. A hybrid H vehicle must comprise the components of both leader L and follower F, typically comprising a receiver 152 connected to a controller 154 as well as a source 112, either as individual components or as a single package 150.

Hybrids H may start out during a swarm performing one role (e.g. a follower F), but on a cue convert to a leader L. The cue may be predetermined (e.g. timed) and other vehicles in the swarm pre-programmed to recognize the new leader. Alternatively, only the original leader L need to convert to a follower F and allow the remaining followers automatically move to follow positions FP relative to the new leader. In some embodiments, a hybrid H may convert a swarm with one leader L to a swarm with two leaders L, or swarm with a plurality of leaders L to a swarm with a plurality of leaders plus one additional leader.

Hybrid switching between leader L and follower F and visa-versa may include, but is not limited to, time, depth, new absolute location acquisition, sensor data, battery state, and an external communication. One example of a swarm comprising two or more hybrids H is when a first vehicle comes to the ocean surface, obtains a GPS fix, gets over-the-air commands from a human-occupied vehicle (e.g. a mother-ship), and becomes the leader L. Once the first vehicle is a leader L, it begins to produce signals S from its source 112, and may begin movement, and either remain surfaced or dive. The remaining vehicles follow, then a second vehicle, typically pre-determined, may surface after a given period of time, or after a different cue is obtained, get a GPS fix, receive over-the-air communications from the human-occupied vehicle and become the leader L. The first vehicle may be pre-programmed to switch to follower F status after the pre-determined time (or other cue), or may monitor for signals S at a given frequency such that it is informed when the second vehicle transitions to leader L status. The first vehicle then becomes a follower F. Alternatively the swarm could be programed to transition to a two-leader swarm, typically with a pre-determined spacing between leaders.

Doppler Shift Derivation

Figure 2A:
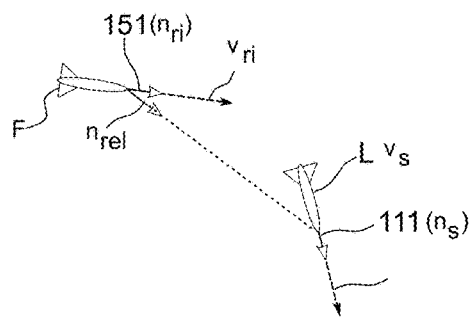
FIG. 2A is an illustrative view of the velocities and velocity vectors of leader and follower according to one embodiment disclosed herein.
Figure 2B:
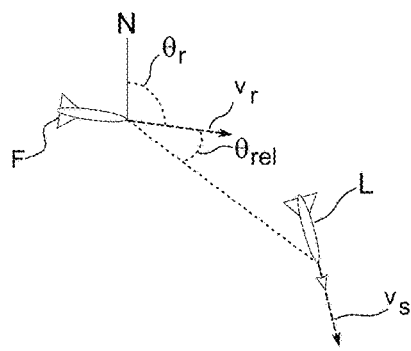
FIGS. 2B and 2C are two illustrative views of the angles associated with Doppler shift between leader and follower according to the embodiment.
Figure 2C:
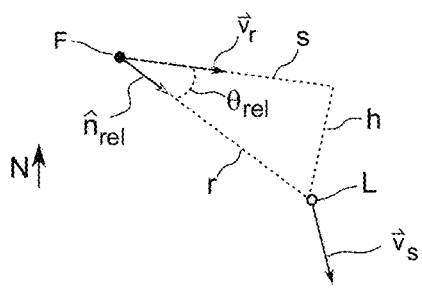
Figure 7A:
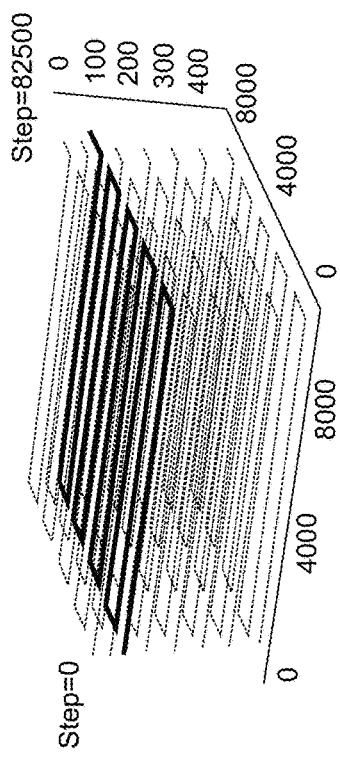
FIGS. 7A and 7B illustrate simulation results for lawnmower virtual experiments with 0 error in frequency. The illustrated amplitude estimation are shown in FIGS. 7C and 7D, with $\sigma_{bhv}$ and $\varepsilon_{bhv}$ denoted as dotted lines indicating $r_{desired}$=500 m and solid lines indicating $r_{desired}$=1000 m. As in the random seeding experiments, the larger offset distance results in greater error at turns but lower variance.
Figure 7B:
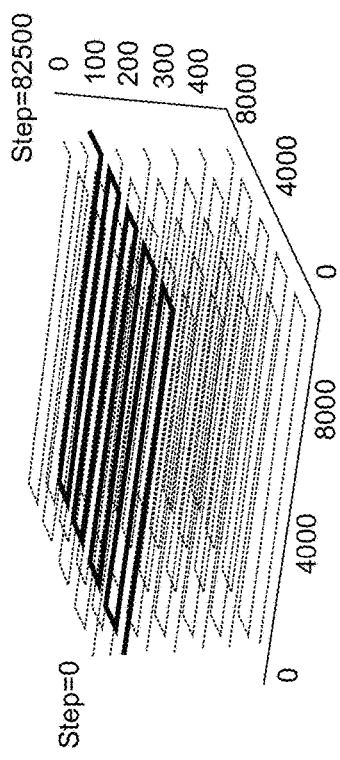
Figure 7C:
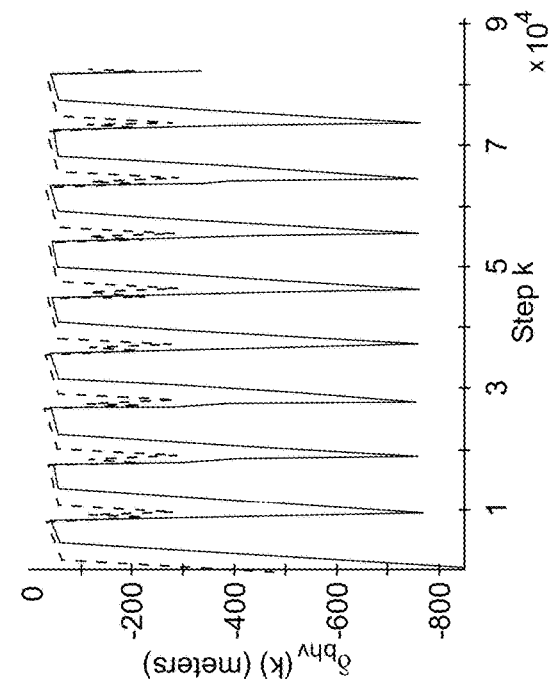
Figure 7D:
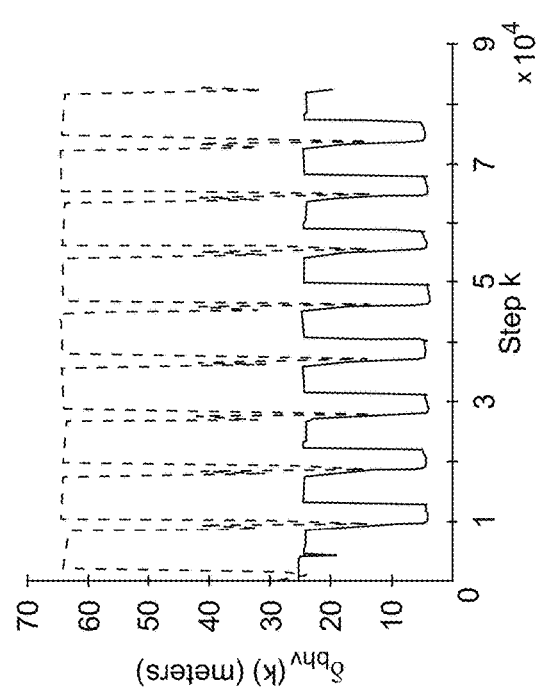

As illustrated in FIGS. 2A-2C, follower's F heading is described by vector $v_r$, and the leader L has a heading described by vector $n_s$. For each follower F, Math 1 expresses the calculation of the received frequency $f_r$ based on source frequency $f_s$ (the reference frequency) from leader L, a velocity of the follower $\vec{v}_r$ and a velocity of the leader $\vec{v}_s$, and a unit vector $\hat{n}_{rel}$ connecting leader L and follower F. The unit vector $\hat{n}_{rel}$ may be defined in terms of an angle between the receiver velocity vector $v_r$ and the normal vector connecting source 112 (and therefore leader L) and receiver 152 (and therefore follower F) as $\vec{v}_r \cdot \hat{n}_{rel} = |\vec{v}_r| \cos(\theta_{rel})$. A controller, either a controller commonly present in a follower F, or a dedicated controller 154, may then perform the following calculations disclosed herein.

$$f_r = \frac{f_s(c + \vec{v}_r \cdot \hat{n}_{rel})}{c + \vec{v}_s \cdot \hat{n}_{rel}} = \frac{f_s(c + |\vec{v}_r|\cos(\theta_{rel}))}{c + \vec{v}_s \cdot \hat{n}_{rel})} \quad \text{Math 1}$$

A follower senses a maximum in $f_r$ (and therefore a maximum frequency shift) when $v_r$ is in the same direction as $\hat{n}_{rel}$ or when $\cos(\theta_{rel})=1$, meaning that without knowing its own position, speed, leader L position, or leader velocity, each follower can control heading based on this received signal S frequency to choose the vector moving towards the leader with Math 2. While following or moving through the medium (i.e. fluid environment), the follower F continues to receive signals S through the medium, when additional signals S are received and those signals S may have a different frequency and therefore frequency shifts, these signals are referred herein as "additional signals" to distinguish their altered frequency properties.

$$f_r, \max = \frac{f_s(c + |\vec{v}_r|)}{(c + \vec{v}_s \cdot n_{rel})}. \quad \text{Math 2}$$

Alternatively, for any value of $v_s$, argmax $f_r$ occurs when the follower F is moving directly towards the source 112 (and therefore leader L), and can be expressed with Math 3. The maxima (of maximum frequency shift) for follower F may be found by changing heading in a mechanical gradient ascent algorithm, where the heading is changed and additional Doppler shift or frequency is measured and when higher values are found, the heading is moved more towards that direction, taking the 'accent'.

$$|\vec{v}_r| = \vec{v}_r \cdot \hat{n}_{rel} \quad \text{Math 3}$$

By adapting vehicle heading based on $f_r$, the follower finds the heading that corresponds to the direction towards the leader ($f_r = r_{r,max}$ or $\theta_{rel} = 0$), without explicitly requiring $\vec{v}_s$.

If the source velocity $\vec{v}_s$ is known, bearing $\theta_{rel}$ from each follower F to the leader L may be reconstructed directly from this known Doppler shift. This would occur when the source is fixed, for example, in the deployment/recovery mission parts, when data is being analyzed in post-processing, or if source position and velocity are communicated in real time.

Alternately, a vehicle may experimentally determine $f_{r,max}$ if the velocity of the leader L could be assumed constant.

The sensitivity of this angle estimate to precision in the frequency estimate for a 100 kHz signal S is shown in FIGS. 3A and 3B, showing difference versus $\theta_{rel}$ for magnitude assuming a source velocity vector of $v_s = <1.2, 0>$ and a receiver velocity vector of $v_r = <1:4 \cos \theta_{rel}, 1:4 \sin \theta_{rel}>$ where the first part of the vector is along the line between receiver 152 and source 112 in the direction indicated by $\hat{n}_{rel}$ in FIGS. 2A-2C, and the second part is perpendicular to $\hat{n}_{rel}$, as shown in Math 4. FIG. 3A shows the full range of angles and FIG. 3B is the section of FIG. 3A between angles −30 to 30 degrees angle.

$$\Delta\theta_{rel} = \theta_{rel} - \frac{c(f_r + \Delta f_r - f_s)}{f_s|\vec{u}|}. \quad \text{Math 4}$$

Lower accuracy has a particular impact on small angles $\theta_{rel}$, as the total Doppler shift is smaller in that region per degree of differential angle. Precise frequency estimation is therefore critical to the accuracy of bearing reconstruction: while 1 Hz frequency estimation accuracy would make it possible for a follower F to remain with the leader L due to the feedback nature of the autonomy, 0.05 Hz accuracy makes 5 degree estimation theoretically possible at 100 kHz, equivalent to the accuracy attained by other, known in the art systems (e.g. the OWTT iUSBL system).

Even as $\hat{n}_{rel}$ changes due to changes in $v_r$ and $v_s$, $f_{r,max}$ corresponds to the follower F moving directly towards the leader L. If follower F heading is described by direction in $v_r$, the heading that corresponds to $\hat{n}_{rel}$ can be found based on the minimum of the derivative of the received frequency with respect to heading, as illustrated in Math 1 and Math 2.

Defining the angles that describe the above equations are illustrated in FIGS. 2A-2C, $\theta_r$ is the angle of heading of the follower F in East-North-up coordinates and, $\theta_{rel}$ is bearing to the leader L. Differentiating the received frequency at the follower F relative to the heading of the follower F is shown in Math 5, Math 6, and Math 7. Of note, the method disclosed herein contains only one integration to solve a differential equation, meaning the method inherently has less error introduced by the operations than methods requiring more than one integration.

$$\frac{df_r}{d\theta_h} = \frac{f_s}{c - |\vec{v}_s|n_s \cdot n_{rel}} \frac{d}{d\theta_h}[c + |\vec{v}_r n_r \cdot n_{rec}|] \quad \text{Math 5}$$

$$n_s \cdot n_{rel} = \cos(\theta_r) \quad \text{Math 6}$$

$$\frac{df_r}{d\theta_h} = \frac{f_s}{c - |\vec{v}_s|n_s \cdot n_{rel}} \frac{d}{d\theta_h}[c + |\vec{v}_t|\cos(\theta_r). \quad \text{Math 7}$$

The angle $\theta_r$ can be defined in terms of $\theta_h$ (the heading of the follower in East-North-up coordinate frame) and some angle γ, and the angle of the line (labeled d in FIG. 1A) connecting leader and follower ($\theta_r = \gamma - \theta_h$). When a follower F is pointed directly at leader L ($\gamma = \theta_h$), the maximum Doppler shift will occur. This substantiates the intuition that the Doppler shift will have a maximum when the follower's velocity vector is moving it on a direct interception course to the leader L, regardless of the velocity vector for the follower F. Therefore, by modifying the heading of the follower $\theta_h$ we can mechanically find the maximum frequency as the heading that gives the follower the maximum rate of approach to the leader, regardless of the leader speed and characteristics.

Estimating Range

It is within the scope of the present invention for some embodiments to also estimate range between leader L and follower F. Range estimation is approximated by exploiting absorption differences of the medium (e.g. water) at different frequencies, especially when the velocity vector of the source 112 is unknown. Assuming deep water and a mid-water-column sound source, the basic sonar equation can be used to describe the received level of signal RL based on the source level SL and the transmission loss TL and the noise N, as expressed in Math 6. It is within the scope of the present invention for the received level of signals to be sound, or a different section of the electromagnetic spectrum, however, the RL is still referred herein as received level of sound or sound level. The transmission loss TL has two contributing factors, (i) geometric spreading $TL_{geom}$ and (ii) absorption $\alpha$ by water, where absorption is a strongly frequency-dependent term in units of dB/km, as shown in Math 9.

$$RL = SL - TL + N \qquad \text{Math 8}$$

$$TL = TL_{geom} + \alpha r \qquad \text{Math 9}$$

Geometric spreading $TL_{geom}$ is not frequency-dependent, but absorption $\alpha$ is highly frequency dependent. High frequencies are absorbed at much greater rates than low frequencies. Three regimes that contribute to absorption of sound in seawater are (i) viscous absorption generated by particle motion (dominant in frequencies above 100 kHz), (ii) absorption due to boric acid (dominant in frequencies below 10 kHz), and (iii) magnesium sulfate (dominant in frequencies 10-100 kHz). The general equation for absorption is complex and based on commonly known empirical studies. Equations, tables, and figures for finding $\alpha$ can be found in most ocean acoustic or physical oceanography textbooks. An approximation for the absorption versus frequency can be estimated by combining terms due to the viscous, relaxation of boric acid, and relaxation of magnesium sulfate in dB/km.

Using geometric transmission loss plus absorption to estimate range based on a single frequency is ineffective due to the environmental variability and background noise. Background noise may be captured during times that source 112 is not emitting signals S and referred herein as baseline signals. Signals S are often time-defined pulses or pings, and the times lacking a signal ping may be thought of as baseline signals or periods of time. However, the frequency-dependence of this phenomena, especially across decades in frequency, is very large. Over short ranges (<1 km) in deep water, paths for separated frequencies can be assumed to be close together, leading geometric transmission loss $TL_{geom}$ that may be treated as frequency-independent. This means that the difference between the amplitude of two frequencies is due to difference in absorption, and this difference may be used as feedback to control the follower F range to the leader L, as expressed in Math 10 and Math 11.

High frequencies attenuate much more rapidly than low frequencies and this effect can be exploited to estimate approximate range. For example, a 1 kHz signal travelling 100 m will have a TL value of 40 dB, whereas a 100 kHz signal travelling the same distance will have a TL value of 43 dB. This 3 dB difference describes a factor of two in amplitude. Increasing the spread in frequencies increases the effect further, and more than two frequencies may be used to improve the solution on range versus attenuation. This frequency-dependent difference in absorption can be used to directly estimate range.

It is within the scope of the present invention to provide more than one set of frequencies for the use of attenuation range-finding. In one embodiment one set of frequencies is used to determine long-distance range, for example sound waves, and a second set of frequencies is used to determine short-distance range, for example light waves. Because light attenuates significantly faster than sound waves, precise ranging for in-close operations is possible by providing this second set of frequencies, typically from a second source mechanism. The first set is preferably included, due to the second set's (e.g. light waves) inability to travel long distances in a medium (e.g. water).

In practice, there is uncertainty in this estimate caused by variations with properties such as sound speed profile. 3D acoustic effects, interaction with the surface, and interaction with the bottom can also cause variation in the signal. Variable, frequency-dependent noise in the medium is also an issue. RL is the actual measurement, so the estimate obtained will look as shown in Math 10 and Math 11.

$$\Delta RL = (SL_{f1} - TL_{f1} + N_{f1}) - (SL_{f2} - TL_{f2} + N_{f2}) \qquad \text{Math 10}$$

$$\Delta RL = SL_{f1} - SL_{f2} + (\alpha(f_2) - \alpha(f_1))R + N_{f1} - N_{f2}. \qquad \text{Math 11}$$

This difference in measured receive level may directly estimate range $\tilde{r}$ given estimates of source levels $\widetilde{SL}$, noise levels $\tilde{N}$ and vales for a at each frequency, as illustrated in Math 12.

$$\tilde{r} = \frac{\widetilde{\Delta RL} - \widetilde{SL}_{f1} + \widetilde{SL}_{f2} + \tilde{N}_{f1} - \tilde{N}_{f2}}{\tilde{\alpha}(f_1) - \tilde{\alpha}(f_2)}. \qquad \text{Math 12}$$

Where $\widetilde{\Delta RL}$ is the estimate of the difference in received level in dB between frequencies $f_1$ and $f_2$ from series measurements, $\widetilde{SL}_{f1}$ is the estimated source level at frequency $f_1$, $\widetilde{SL}_{f2}$ is the estimated source level at frequency $f_2$, and $\tilde{N}_{f1}$ and $\tilde{N}_{f2}$ are estimates of noise properties at the frequencies of interest based on sensing when there is no sound signal. The estimate of r can then be calculated as a function of errors in noise estimates $\epsilon_N = N - \tilde{N}$, source level estimates $\epsilon_{SL} = SL - \widetilde{SL}$, and estimates of a as shown in Math 13.

$$\tilde{r} = \frac{\epsilon_{SL}(f_1) - \epsilon_{SL}(f_2) + \epsilon_N(f_1) - \epsilon_N(f_2) + (\alpha(f_2) - \alpha(f_1))}{\tilde{\alpha}(f_1) - \tilde{\alpha}(f_2)}. \qquad \text{Math 13}$$

Two important factors to the practicality of using the measurement of $\Delta RL$ to find $\tilde{r}$: the level differences in $\Delta RL$ need to be measurable and the sensitivity of $\tilde{r}$ to different factors must be understood. For the first factor, pairs of frequencies were compared to estimate $\Delta RL$ at 100 m of range, as shown in FIG. 4. $\Delta RL$ at 100 m is grayscale-coded in decibels in FIG. 4 assuming identical transmission losses of a first frequency $f_1$ and a second frequency $f_2$.

Noise values of first and second frequencies $\tilde{N}_{f2}$ and $\tilde{N}_{f1}$ may be estimated in real-time when the source 112 is not transmitting (i.e. baseline signals), and source levels may be established a priori, which means that the main source of error is in mismatch between true frequency-dependent absorption α(f) and estimate of absorption $\tilde{\alpha}(f)$. All errors in estimates for everything except α are collected in a single term, η, so that the sensitivity of r−r̃ to α alone may be analyzed, with Math 14.

$$r - \tilde{r} = r - \eta + \frac{\alpha(f_1) - \alpha(f_2)}{\tilde{\alpha}(f_1) - \tilde{\alpha}(f_2)}. \quad \text{Math 14}$$

The precision of the range estimate is limited by these curves: using two closely spaced frequencies decreases signal to noise ratio on the measurement, therefore requiring longer ranges for an estimate of range. A ΔRL of 3 dB (see contour lines numbered 3 in FIG. 4) represent a factor of 2 in magnitude is assumed to be easily measured in field data.

To evaluate the sensitivity to mis-estimation or variation of factors including pH, salinity, temperature, and depth, an analysis was performed on the impact on of error in a priori estimate of those parameters with frequency pair of 100 kHz and 20 kHz, to determine sensitivity. "True" salinity SA was varied between 25 and 40, with an "assumed" salinity $\widetilde{SA}$ of 35. "True" temperature was assumed to be between 0° C. and 40° C., with an "assumed" temperature estimated T of 20° C. "True" pH was varied between 7.1 and 9.1, with "assumed" pH of 8.1. Depth was assumed known.

Salinity mismatch was found to dominate the error in, with a difference in $\alpha(f_1)-\alpha(f_2)$ of up to 40 dB/km with a salinity difference of +5/−10 PSU. In comparison, the difference for 20 degrees of temperature error is only 4 dB/km, and a difference in pH of 1 resulted in an error of only 0.1 dB/km. Salinity was therefore taken as dominant, and used to estimate the range estimation error δr=r̃−r for different salinity mismatch at three pairs of frequencies, with results shown in FIG. 5. The three frequency pairs are shown as frequency pair 1 (fp1) of $f_1$ of 100 kHz and $f_2$ of 20 kHz (solid black line), frequency pair 2 (fp2) of $f_1$ of 60 kHz and $f_2$ of 20 kHz (dashed grey line), and frequency pair 3 (fp3) of $f_1$ of 60 kHz and $f_2$ of 45 kHz (dotted black line). The quantity of range error is small between the different frequency pairs, with a slight increase in range error for the frequencies that are closer together. Each frequency pair is shown for true ranges of zero to 500 meters and for salinity errors of +0 (labeled as S=35 in FIG. 5) to −10 PSU (labeled as S=25). Range error increases with increased negative salinity error. Some increments of salinity error are not shown for simplicity.

Extremes in salinity are unusual outside of near-shore areas near river outflows; ocean water is between 37 and 34 PSU. For ±2 PSU, the total error for the projected mission would be less than 5%, corresponding to a range error of 50 m/km. This error is proportional only to relative range r between leader L and follower F, it does not drift with total distance travelled.

By using multiple frequencies widely separated and choosing a desired ΔRL as a control parameter for selecting vehicle speed in the autonomy code, an approximately constant follower F range to the leader L is maintained any errors in environmental estimates may result in a different range than the desired especially if desired range is less than 500 m, but by feeding back on the differential attenuation approximately constant range is maintained. The range estimate r may furthermore be used along with $\tilde{\theta}_{rel}$ to reconstruct follower F position in post processing.

Position Reconstruction

Once estimated range (from absorption difference estimated $\widetilde{\Delta RL}$ ) and bearing $\tilde{\theta}_{rel}$ (from frequency estimate $f_r$) are known, relative x and y position can be estimated to the leader L using follower F heading $\theta_h$, as shown in Math 15.

$$dx = r \sin \tilde{\theta}_{rel} + \theta_h, \quad dy = r \cos \tilde{\theta}_{rel} + \theta_h. \quad \text{Math 15}$$

$$x_r = x_s + dx, \quad y_r = y_s + d_y. \quad \text{Math 16}$$

The absolute position of the follower, $x_r$, $y_r$ can be reconstructed using known leader position, $x_s$, $y_s$ approximated in Math 16.

The accuracy of such reconstructions are dependent on the following factors: (i) accuracy and precision in estimates of $f_r$ that impact the estimate of $\theta_{rel}$ and (ii) accuracy of estimate of $\vec{v}_r$ and including speed estimate and heading estimate.

A possible complication to reconstruction based on the differential attenuation method is that when the sound source 112 or receivers 152 are near to the surface, multipath interference occurs, where destructive/constructive interference can result in variations as followers increase horizontal range to the leader (multipath fading). This interference is frequency dependent, and would be dealt with in the real world by keeping vehicles close to vertical in the water column where the effect is minimal, and by using more than 2 frequencies so that different combinations may be combined to cancel out the multi path fading and improve position reconstruction.

Simulation Experiments

Simulation experiments had the objective of testing multi-vehicle swarming behaviors for AUVs. In all simulations, the leader L was equipped with a non-time-synchronized source 112 (in this embodiment, a pinger) with a set frequency. The leader L is given a set speed of 1.2 m/s, and all followers are simulated to have a speed of 1.3 m/s. This allows followers to catch up to the leader L and the behavior adaptation parameter was set as described in the previous section. At each time step, a simulated Doppler shift estimator outputs for each follower the current received frequency $f_r$ based Doppler shift from Math 1. Based on the Doppler shift, the simulated vehicles adapt heading with a turn to port or starboard. Each follower F was given a different depth in 10 m increments, and the leader L is assumed to have a known, constant depth. The turn radius of all followers as set to 15 m, and the leader L was assumed to have a worst-case turn radius of 0 m (instantaneous turning).

Two sets of virtual experiments were run to demonstrate the efficacy of the Doppler-based swarming system to keep vehicles together and reconstruct the absolute navigation of the followers in post-processing: a randomly seeded leader path and a conventional lawnmower leader path. For both cases, vertical formations of 50 virtual vehicles were tested. For each virtual experiment, three AUV autonomy schemes were used: Doppler-shift and differential-frequency-attenuation for relative position autonomy method were tested. The virtual experiments all assumed a leader L speed of 1.2 m/s, a follower F speed of between 1 and 1.5 m/s and a follower F turn radius of 15 m. The measured receive level and the estimated frequency were modeled as given in Math 17 and Math 18, respectively.

$$\widetilde{\Delta RL} = \Delta RL + N(0, \sigma_n^2) \quad \text{Math 17}$$

$$\tilde{f}_1 = f_1 + N(0, \sigma_f^2). \quad \text{Math 18}$$

Vehicle behavior performance relative to the leader L were evaluated for both random seed and lawnmower virtual experiments. Position of followers relative to the leader L were used to compare desired and actual vehicle behavior based on the position of a follower i at a step k, as shown in Math 19.

$$\delta_{r,bhv}(k,i) = r_{desired} - r_{k,i}. \quad \text{Math 19}$$

For each time step k, the standard deviation was evaluated between all follower positions to assess how tightly the vehicles remain grouped, as shown in Math 20. And mean and standard deviation of $\delta_{r,bhv}(m, i)$ were also used to get general statistics for behavior performance, as shown in Math 21 and Math 22.

$$\sigma_{bhv}(k) = std_{(r_{k,i} - r_{desired})} \quad \text{Math 20}$$

$$\sigma_{bhv} = std\left(1/K \sum_{k=0}^{K-1}(r_{k,i} - r_{desired})\right) \quad \text{Math 21}$$

$$\epsilon_{bhv} = 1/N \sum_{i=0}^{N-1} 1/M \sum_{k=0}^{K-1} |\delta_{r,bhv}| \quad \text{Math 22}$$

Where the above N is the number of followers, K is the number of samples or steps along the vehicle trajectory, and the true location for the follower i consists of point $(r_{k,i}, \theta_{rel})$.

Reconstruction accuracy was also evaluated based on mean and standard deviation of the reconstruction error, as shown in Math 23 and Math 24.

$$\epsilon_{rec} = 1/N \sum_{i=0}^{N-1} 1/K \sum_{k=0}^{K-1} ((\tilde{x}_{k,i} - x_{k,i})^2 + (\tilde{y}_{k,i} - y_{k,i})^2)^{1/2} \quad \text{Math 23}$$

$$\sigma_{rec} = std\left(1/K \sum_{k=0}^{K-1} ((\tilde{x}_{k,i} - x_{k,i})^2 + (\tilde{y}_{k,i} - y_{k,i})^2)^{1/2}\right). \quad \text{Math 24}$$

Two desired ranges $r_{desired}$ were tested: 1000 m and 500 m. Adaptation in range is achieved only through measurement of attenuation difference: when the value of $\Delta \widehat{RL}$ falls more than 1 dB below the desired value, the follower F may slow down to increase range. When the value of $\Delta \widehat{RL}$ is more than 1 dB above the desired value, the follower F may speed up to decrease the range.

For each randomly seeded virtual experiment, a random set of 4 waypoints were selected for the leader L in an area 10 km by 10 km to assess the performance of the swarming technique to turning. The 50 followers were randomly initialized at a location a maximum of 100 m from the leader L initial location, oriented with a random heading emulating the "Wait" mode. One hundred and twenty leader paths were tested per virtual experiment. Pseudo-random seeding was used so that the same leader paths are directly compared between different adaptation parameters. FIGS. 6A-6F shows several examples of leader L and follower paths resulting from a random seeding. For simplicity only a subset of the 50 followers are shown. FIGS. 6A-6C illustrates the $r_{desired}$ of 1000 m and FIGS. 6D-6F the $r_{desired}$ of 500 m. The scatter plot in FIG. 6G shows leader-follower distance error $\epsilon_{hbv}$ and the scatter plot in FIG. 6H shows leader-follower standard deviation $\sigma_{bhv}$ in meters for desired distances of 500 (x's) and 1000 m (circles).

The 1000 m distance had a larger magnitude error versus the desired distance and a smaller variance than the 500 m standoff distance. This behavior results because in the $r_{desired}$=1000 m case the followers hang back, adjusting their speed to remain further away, but with a slower response to changes in heading.

A conventional lawnmower pattern cover a 10 km×10 km test area was used to assess the performance of the swarming technique to more standard AUV operations, as well as to determine the impact of error in $\delta \widehat{RL}$ and r on behavior and reconstruction errors. Two stand-off distances were used: 1000 m and 500 m. FIGS. 7A-7D shows example lawnmower patterns including a leader and followers with the two distances, along with the behavior error versus navigation step along the follower paths for $\sigma_f$ and $\sigma_n$ of 0.

Introducing error was found to have limited impact on general follower F behavior, with the general follower F pattern remaining consistent, with the followers trailing the leader L with frequency errors of up to 1 Hz and $\Delta$RL errors of up to 3 dB. Increasing $\sigma_f$ resulted in increased variance in the behavior error, as followers attempted to maintain $\theta_{rel}$=0 in the presence of frequency noise. Increasing $\sigma_n$ resulted in increased variance as well. Since the mean was taken to be 0 due to the assumption that environmental noise is characterized in real time, there was no significant effect on the average range between leader and followers or the general follower F behavior.

Figure 8A:
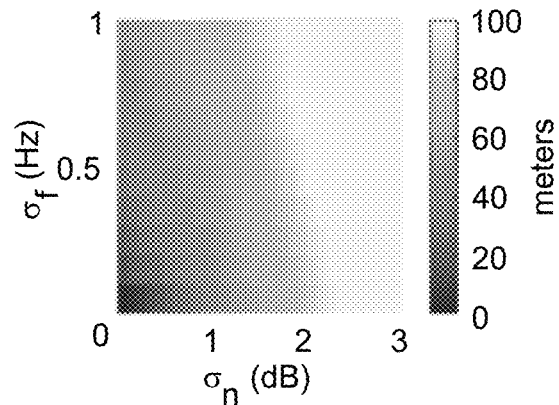
FIGS. 8A-8D represent average reconstruction error and variance of reconstruction error versus $\sigma_{bhv}$ and $\varepsilon_{bhv}$. Units for $\varepsilon_{rec}$, $\sigma_{rec}$ are in meters, $\sigma_f$ in Hz, and $\sigma_n$ in dB.
Figure 8B:
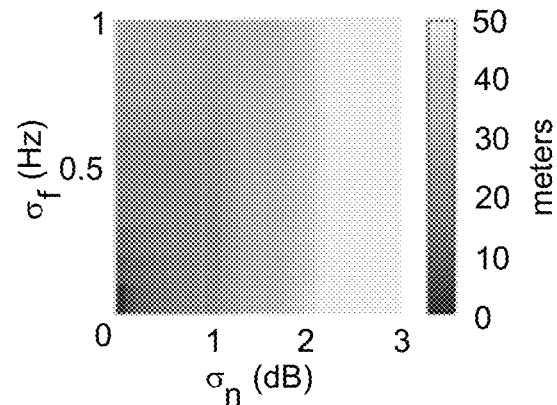
Figure 8C:
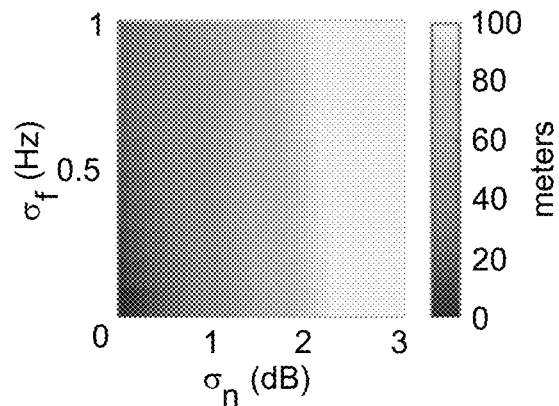
Figure 8D:
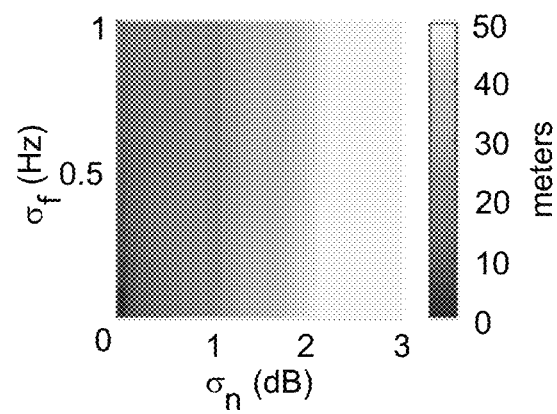

The greatest impact of errors in frequency estimate and amplitude estimate are the accuracy of reconstruction: when either parameter in incorrect, error is introduced to the calculation of position. The mean and standard deviation of reconstruction error for a range of $\sigma_f$ and $\sigma_n$ values is shown in FIGS. 8A-8D as mean and variance of reconstructed error in meters. FIGS. 8A and 8B show a $r_{desired}$ of 1000 m and FIGS. 8C and 8D show a $r_{desired}$ of 500 m. FIGS. 8A and 8C show E mean of reconstruction error and FIGS. 8B and 8D show a standard deviation of reconstruction error. Errors in frequency and amplitude estimation have generally expected impact on reconstruction: increased error, particularly in estimation of amplitude, results in reconstruction errors of greater than 100 m. Since the error does not grow versus distance travelled, these simulation results can be used as a metric to determine the required accuracy in amplitude difference estimation for a given standoff range $r_{desired}$: to achieve an average reconstruction error of less than 50 m with a 1 km $r_{desired}$, for example, requires $\sigma_n$<1 dB if the standard deviation of the frequency estimation error $\sigma_f$=0.1 Hz, both achievable with the prototype system with characterization of source parameters and ambient noise.

Example 1

The problems of low-cost AUV swarming will now be considered herein with a specific example. The problems having several criteria of (i) keeping a scalably large number of AUVs together in the ocean, with all vehicles knowing their position relative to some common reference (leader L), (ii) reconstructing AUV absolute locations on the earth for post processing/assimilation of data into maps, (iii) meeting criteria (i) and (ii) while being low-cost (<5% of vehicle cost), low- to medium-power-draw (<2 W), and fitting on a small (e.g. 4.875 inch diameter) AUV, and finally (iv) being robust to the loss of individual agents in the group.

The reason for this set of required criteria is to have a solution that can be broadly adoptable as multi-AUV systems become realized. The solution to the scalable underwater formation problem must address these challenges such that vehicles remain together with a common reference frame, and that logged data across the group is sufficient to reconstruct global navigation (i.e. absolute navigation). The required accuracy of this global reconstruction depends on the application: for most oceanographic sensing, accuracy in tens to hundreds of meters is sufficient, whereas for image-based mapping more accurate navigation is required.

"Scalable" is defined here as an approach that works for arbitrarily large numbers of vehicles within a sampling area—for example 100 AUVs within a 1 km area through the water column. An example of a solution that would not be considered scalable would be conventional two-way acoustic communications such as the commonly known Micromodem: the number of vehicles is limited by frequency and time sharing required by the channel. "Low-cost" translates to a production payload cost preferably of less than $500, which correspond to about 5% of the minimum cost of current low-cost AUV models such as the Riptide, and Bluefin SandShark vehicles. This eliminates chip scale atomic clock-type timing solutions and many array and lower-frequency transducer options.

One-way communication with leader-follower-based architecture provides a means to have common reference between the underwater vehicles and deals with the scalability issues with two-way or multi-way communication networks. As high-frequency acoustic and optic modem technologies increase underwater bandwidth, certain embodiments of the present invention are well suited to incorporate such underwater communications improvements into the Doppler-based solution presented herein.

In this example, the leader L is assumed to have reliable navigation, and could one of many solutions, including an AUV with an INS/DVL or a surface vehicle with GPS towing an acoustic source 112. Alternate configurations not explored here, but are within the scope of the present invention, would include a homogeneous group of low-cost vehicles taking turns surfacing and becoming the leader L, or using multiple leaders to further collapse follower F localization.

Follower F adaptation is dependent on one of two, or both measurements: frequency of the incoming signals S, and amplitude of the incoming signals S at two or more frequencies. Frequency changes due to Doppler shift, in which relative motion causes a frequency shift. By adapting heading to maximize the Doppler shift, each follower F remains pointing towards the leader L in a swarming-type behavior. Speed may also be varied adaptively based on the received amplitudes of two or more transmitted frequencies, which provide an approximation for range. Attenuation of frequency can be thought of as the difference between received frequency level (i.e. amplitude) with a reference frequency level (i.e. amplitude), with the reference frequency being the known or determined source frequency and/or amplitude, depending on the embodiment. With frequency-dependent attenuation of sound acting as a stand-in for range in some embodiments and Doppler shifted frequency acting as a stand-in for bearing, relative AUV behaviors can be constructed in a range-bearing space similar to that explored for relative one way time-travel (OWTT)-inverted USBL (iUSBL), as described in U.S. patent application publication US-2019/0204430-A1, but with one tenth the system parts cost.

A mission profile for such a system typically includes three parts: deployment, sampling, and recovery. In deployment and recovery, a fixed beacon (i.e. source 112) on a ship or mooring would be used as a fixed reference frame to build up the AUV (i.e. follower F) formation for deployment, and to collapse it and bring the vehicles safely back in recovery. In fixed-beacon mode, Doppler shift may be used on each AUV to estimate bearing directly in real time, and with adaptation make recovery possible. For sampling, a leader L carries a dual-frequency acoustic beacon, and follower AUVs use estimates of Doppler shift and frequency-differences in attenuation to approximate range and bearing, which are used in different swarming behaviors.

Three possible electronic controller set ups were compared during this example, (i) an Ardunio-type microcontroller without analog electronics (referred to as Ardunio only), a DAQ-based microcontroller (DAQ Design) and a DAQ-based microcontroller with a custom analog front-end (Analog Front). The Ardunio Only microcontroller is flexible, requires only about 0.8 A at 5 V and about 0.4 W power, and has a theoretical accuracy of approximately 10 Hz for 1 second of data. However, the Ardunio Only did not achieve sufficient frequency resolution in this example. The DAQ-based undersampling resulted in a accuracy of only 1 Hz, which is still too low for accurate angle reconstruction, while requiring 1.5 A and 7.5 W power, resulting in a system well suited for collecting raw data, but not processing. The Analog Front microcontroller requires 0.1 A at 5V and 0.5 W for power, is still flexible requiring hardware tuning, but is still applicable and was determined to meet frequency estimation and power requirements of about 0.1 A at 5 volts and about 0.5 W, while providing about 0.01 Hz frequency resolution. This configuration enables flexible hardware using required but applicable hardware.

The resulting prototype analog electronics hardware front end uses a sample and hold with undersampling and bandpass filtering, producing an undersampled wave that is filtered to obtain a clean aliased tone. A Schmitt trigger then converts the sinusoidal signal to a square wave, and frequency and amplitude are then estimated using an Arduino MkrZero microcontroller with an interrupt-based period detection method. With an oscillator frequency of 48 kHz on the Arduino MkrZero and an aliased tone around 1 kHz, the frequency accuracy is 0.02 Hz. This uncertainty compounds with the Cramer-Rao lower bound with a variance of around 0.015 Hz. These two sources of error combined for an error of 0.035 Hz, meeting the frequency estimation requirement for position reconstruction. The prototype analog boards were tested using a Teledyne Reson TC4013 hydrophone element, and were experimentally shown to estimate frequency within this bound in short-range field tests using a moving source at ranges up to 20 m for 20 kHz, 36 kHz, 45 kHz and 100 kHz tones. Preliminary tank and dock tests were sufficiently promising to begin systems integration of the prototype with a JetYak ASV and SandShark AUV for further long-range field trials. The great advantage of this system over the other options in the design matrix come from size, power requirements, and accuracy.

Example 2

Bearing and or heading estimation from Doppler shift. In this example, the concepts described above herein are applied conceptually and mathematically in three situations that may be easier to understand. Here a heading to a source 112 based on Doppler shift estimation, spanning the scenarios of whether $\vec{v}_s$ is one of (1) zero (i.e. not moving), (2) known, or (3) unknown and whether $f_s$ is known or unknown.

In the first scenario, when source 112 velocity is zero, the bearing from the receiver 152 to the source 112 ($\theta_{rel}$) can be estimated directly based on the received frequency $f$ for a case where the source velocity $|v_s|=0$ and the source frequency $f_s$ is known, and represented as in Math 25.

$$\cos(\theta_{rel}) = \frac{c(f_r - f_s)}{|v_r|f_s}. \qquad \text{Math 25}$$

If $f_s$ is unknown but the source 112 is known to be stationary, source frequency must first be estimated. This is done by setting receiver 152 velocity to 0, i.e. $\vec{v} = \vec{0}$, in which case $f_r = f_s$. Once $f_s$ is known, Math 25 may be used. In addition, zero source 112 velocity makes it possible to simplify the relationship between source 112 and receiver 152 frequencies further by describing the received frequency as the source frequency plus a Doppler shift $f_d$ as represented in Math 26 and Math 27.

$$f_r = \frac{f_s(c + \vec{v}_r \cdot \hat{n}_{rel})}{c}, \qquad \text{Math 26}$$

$$f_r = f_s + \frac{f_s |\vec{r}_r| \cos(\theta_{rel})}{c} = f_s + f_d. \qquad \text{Math 27}$$

In the second scenario, when source velocity is non zero: If the source velocity is non-zero, and frequency is known, receiver 152 adaptation is used to first estimate the magnitude of the source velocity along the relative normal vector, i.e. $\vec{v}_r \cdot \hat{n}_{rel}$. To do this, the receiver stops, so that the frequency shift may be measured, as represented in Math 28 and Math 29.

$$f_r(\vec{v}_r = 0) = f_s \frac{c}{c - \vec{v}_s \cdot \hat{n}_{rel}} \qquad \text{Math 28}$$

$$\vec{v}_s \cdot \hat{n}_{rel} = c - \frac{f_s}{f_r(\vec{v}_r = 0)} \qquad \text{Math 29}$$

The receiver 152 may then begin moving with constant velocity $\vec{v}_r$ so that bearing may be directly estimated, as represented in Math 30.

$$\cos(\theta_{rel}) = \frac{f_r/f_s(c - \vec{v}_s \cdot \hat{n}_{rel}) - c}{|\vec{v}_r|} \qquad \text{Math 30}$$

This process would need to be repeated as $\vec{v}_r \cdot \hat{n}_{rel}$ changes because the source 112 is approaching/departing from the receiver 152, or as $\vec{v}_s$ changes.

In the third scenario, unknown source frequency: If $f_s$ is unknown, the frequency associated with the velocity of the source 112 relative to the receiver 152 ($f_a$ for aggregate frequency) can be used instead from a "stop" adaptation, and represented in Math 31.

$$f_a = f_s \frac{c}{c - \vec{v}_s \cdot \hat{n}_{rel}} \qquad \text{Math 31}$$

Constant-velocity receiver 152 motion is then used to estimate $\theta_{rel}$, as shown in Math 32.

$$\cos(\theta_{rel}) = \frac{f_r/f_a - c}{|\vec{v}_r|}. \qquad \text{Math 32}$$

An alternative adaptation to the stop-and-then-resume constant velocity behavior is to circle, estimating received frequency $f_r$ versus heading h (also referred herein as $\theta_{rel}$ and illustrated in FIG. 2B). The maximum frequency $f_{r\,max}$ during a 360-degree revolution at constant speed corresponds to the heading to the sound source; $f_a$ corresponds to the mean of the minimum and maximum received frequencies and is represented in Math 33.

$$f_r = \frac{f_s(c + \vec{v}_r \cdot \hat{n}_{rel})}{(c - \vec{v}_s \cdot \hat{n}_{rel})}. \qquad \text{Math 33}$$

Although specific features of the present invention are shown in some drawings and not in others, this is for convenience only, as each feature may be combined with any or all of the other features in accordance with the invention. While there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps that perform substantially the same function, in substantially the same way, to achieve the same results be within the scope of the invention. Substitutions of elements from one described embodiment to another are also fully intended and contemplated. It is also to be understood that the drawings are not necessarily drawn to scale, but that they are merely conceptual in nature.

It is the intention, therefore, to be limited only as indicated by the scope of the claims appended hereto. Other embodiments will occur to those skilled in the art and are within the following claims.

What is claimed is:

1. A non-transient computer readable medium containing program instructions for causing a computer to perform the method of:
   (a) receiving from a receiver first signals having a first frequency and a second frequency emitted from a source;
   (b) determining a first frequency shift by comparing said first frequency with a reference frequency;
   (c) calculating a bearing of said receiver relative to said first frequency's source using said first frequency shift;
   determining a first and second received signal levels of said first and second frequencies, respectively;
   estimating a first and second absorptions of said first and said second frequencies; and
   estimating a range between said receiver and said source using said first and second received signal levels and said first and second absorptions.

2. The non-transient computer readable medium of claim 1 further including the steps of:
   (d) receiving additional first signals having a first frequency emitted from said source;

(e) determining a second frequency shift by comparing said first frequency of said additional first signals with said reference frequency; and (f) determining a maximum frequency shift between said first frequency shift and said second frequency shift;

wherein step (c) of calculating said bearing uses said maximum frequency shift in place of said first frequency shift.

3. The non-transient computer readable medium of claim 2 further including the step of:

(g) instructing a change in heading of said receiver; and wherein step (g) is performed before step (d).

4. The non-transient computer readable medium of claim 1 wherein said first and second received signal levels are calculated using source a first and second signal level of said emitter, transmission loss and an estimation of noise.

5. The non-transient computer readable medium of claim 1 wherein said range is further estimated using estimates of source signal levels, and noise levels.

6. The non-transient computer readable medium of claim 4 wherein said range is further estimated using a function of errors in noise estimates, and of errors in source level estimates.

7. The non-transient computer readable medium of claim 5 further including the steps of:

(k) receiving baseline signals having a first and second frequency from said receiver, wherein said baseline signals are captured during periods said source is not emitting said first signals; and (l) estimating said noise levels using said first and second frequencies of said baseline signals.

8. The non-transient computer readable medium of claim 1 further including the step of:

(m) estimating a relative position of said receiver relative to said source using said range and said bearing.

9. The non-transient computer readable medium of claim 8 further including the step of:

(n) reconstructing an absolute position of said receiver using said relative position and a known position of said first signals' source.

10. The non-transient computer readable medium of claim 1 further including the step of:

(o) receiving, from a heading mechanism, a heading; wherein step (c) of calculating said bearing further comprises a single numerical integrating differential equation describing said first frequency and said heading.

11. A system for relative navigation in a medium, comprising:

a first vehicle comprising a first source, said first source configured to produce first signals capable of traveling through the medium; and a second vehicle comprising an interconnected first receiver and first controller, said first receiver configured to detect said first signals in the medium; and wherein said first controller receives information from said first receiver and is configured to determine the Doppler shift of said first signals and wherein said first controller determines the bearing of said second vehicle relative said first vehicle using said Doppler shift;

wherein said first signals comprise at least two frequencies and wherein said first controller determines the attenuation of said at least two frequencies to determine the range between said first and second vehicles.

12. The system of claim 11:

wherein the first vehicle further comprises an interconnected second receiver and second controller, said second receiver configured to detect signals in the medium; and wherein the second vehicle further comprises a second source, said second source configured to produce a second signals capable of traveling through the medium; and wherein the first vehicles' first controller receives information from said first receiver and is configured to determine the Doppler shift of said second signals and wherein said first controller determines a bearing of said first vehicle relative to said second vehicle.

13. The system of claim 12 further comprising:

a third vehicle, comprising an interconnected third receiver and third controller, said third receiver configured to detect said first and second signals in the medium;

wherein said third controller receives information from said third receiver and is configured to determine the Doppler shift of said first and second signals; and wherein said third controller is configured to determine a bearing of said third vehicle relative to said second vehicle and a bearing of said third vehicle relative to said first vehicle.

14. The system of claim 11 further comprising a third vehicle comprising a second interconnected receiver and a second controller, said second receiver configured to detect said first signals in the medium; and wherein said second controller receives information from said second receiver and is configured to determine the Doppler shift of said first signals and said second controller determines a bearing of said third vehicle relative said first vehicle.

15. A device for determining the bearing of a signal in a medium, comprising:

a receiver, configured to receive first signals having a first frequency in the medium;

a controller connected to said receiver, configured to receive information on said first signals from said receiver and configured to determine a first frequency shift of said signals using said first frequency and a reference frequency, and to determine a bearing of said receiver relative to the source of said first signals; and a connector connected to said controller and configured to provide information output from said controller to another device;

wherein said first signals comprise a second frequency and wherein said controller determines the attenuation of said first and second frequency to determine a range between said receiver and the source of the first signals.

16. The device of claim 15 wherein said controller is configured to estimate a relative position of said receiver relative the source of said first signals using said range and said bearing, and estimate an absolute position of said receiver using said relative position and a known position of the source of the first signals.

* * * * *